(12) United States Patent
Hotta et al.

(10) Patent No.: US 7,286,966 B2
(45) Date of Patent: Oct. 23, 2007

(54) ROTATION PLANNING APPARATUS AND ROTATION PLANNING SYSTEM

(75) Inventors: Miyako Hotta, Tokyo (JP); Yoshitaka Kojima, Tokyo (JP); Kenji Araki, Tokyo (JP); Yoshikazu Moritomo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 683 days.

(21) Appl. No.: 10/400,437

(22) Filed: Mar. 28, 2003

(65) Prior Publication Data

US 2003/0187530 A1  Oct. 2, 2003

(30) Foreign Application Priority Data

Apr. 2, 2002 (JP) ............................ 2002-099478
Mar. 7, 2003 (JP) ............................ 2003-060780

(51) Int. Cl.
*G06F 17/40* (2006.01)
*G06F 7/00* (2006.01)
*G06F 19/00* (2006.01)
*G06F 7/76* (2006.01)

(52) U.S. Cl. .................. 702/184; 340/870.07; 700/34; 700/182; 700/183; 705/7; 705/8

(58) Field of Classification Search ............... 324/500, 324/511; 340/853.2, 870.01, 870.07, 870.16, 340/500, 635, 679, 680, 3.1, 3.43; 700/90, 700/108; 702/33, 34, 127, 182, 183, 184, 702/185, 188; 705/7, 8, 9
See application file for complete search history.

(56) References Cited

U.S. PATENT DOCUMENTS

| | | | | |
|---|---|---|---|---|
| 3,184,725 A | * | 5/1965 | Siegel et al. ................. | 340/674 |
| 5,040,123 A | * | 8/1991 | Barber et al. ................ | 700/100 |
| 5,210,704 A | * | 5/1993 | Husseiny ...................... | 702/34 |
| 5,216,612 A | * | 6/1993 | Cornett et al. ................ | 700/96 |
| 5,231,594 A | * | 7/1993 | Knibiehler et al. .......... | 702/177 |
| 5,311,562 A | * | 5/1994 | Palusamy et al. ........... | 376/215 |
| 6,192,325 B1 | * | 2/2001 | Piety et al. .................. | 702/184 |
| 6,473,677 B1 | * | 10/2002 | Hershey et al. ............... | 701/30 |

(Continued)

FOREIGN PATENT DOCUMENTS

EP       1172717 A2     1/2002

(Continued)

OTHER PUBLICATIONS

"Optimum Task Schedule for Scheduled Maintenance" IBM Technical Disclosure Bulletin May 1, 1978 vol. 20, No. 12 p. 5338.*

(Continued)

*Primary Examiner*—Edward R Cosimano
(74) *Attorney, Agent, or Firm*—Crowell & Moring LLP

(57) ABSTRACT

An apparatus or system is used for planning the rotation of part usage between shafts or plants based at least on schedule information relating to operation and inspection-purpose shutdown, attribute information relating to part life, part maintenance periods, and other part attributes, and part information relating to the parts to be used in the rotation.

10 Claims, 22 Drawing Sheets

U.S. PATENT DOCUMENTS

| | | | |
|---|---|---|---|
| 6,487,377 B2 * | 11/2002 | Naito et al. | 399/12 |
| 6,671,593 B2 * | 12/2003 | Sinex | 701/29 |
| 7,065,472 B2 * | 6/2006 | Hayashi et al. | 702/184 |
| 7,088,255 B2 * | 8/2006 | Ridolfo et al. | 340/635 |
| 7,143,007 B2 * | 11/2006 | Long et al. | 702/184 |
| 7,194,415 B2 * | 3/2007 | Hamada | 705/1 |
| 7,209,859 B2 * | 4/2007 | Zeif | 702/182 |
| 2003/0101262 A1 * | 5/2003 | Godwin | 709/224 |

FOREIGN PATENT DOCUMENTS

| | | |
|---|---|---|
| EP | 1178417 A2 | 2/2002 |
| JP | 03-242529 A * | 10/1991 |
| JP | 05-035741 A * | 2/1993 |
| JP | 10-176546 A | 6/1998 |
| JP | 10-196403 | 7/1998 |
| JP | 2001-249717 A * | 9/2001 |
| WO | WO 03/021504 A1 | 3/2003 |

OTHER PUBLICATIONS

Japanese Office Action dated May 9, 2006 (Five (5) Pages).

* cited by examiner

| SHAFT ID | SCHEDULED SHUTDOWN PROCESS ID | STARTING DATE | ENDING DATE |
|---|---|---|---|
| SHAFT 1 | SCHEDULED SHUTDOWN 1 | 2002/3/5 | 2002/4/5 |
| SHAFT 2 | SCHEDULED SHUTDOWN 2 | 2002/3/15 | 2002/4/15 |
| SHAFT 3 | SCHEDULED SHUTDOWN 3 | 2002/3/25 | 2002/4/25 |
| SHAFT 4 | SCHEDULED SHUTDOWN 4 | 2002/4/5 | 2002/5/5 |
| SHAFT 1 | SCHEDULED SHUTDOWN 5 | 2002/7/5 | 2002/8/5 |
| : | : | : | : |

FIG. 3

| SHAFT ID | MONTH | THE YEAR 2002 | | | | | | | | THE YEAR 2003 | | |
|---|---|---|---|---|---|---|---|---|---|---|---|---|
| | | MAR. | APR. | MAY. | JUN. | JUL. | AUG. | SEP. | OCT. | NOV. | DEC. | JAN. FEB. |
| SHAFT 1 | | SCHEDULED SHUTDOWN 1 | OPERATING PERIOD 1 ~31 | | | SCHEDULED SHUTDOWN 5 | | OPERATING PERIOD 5 ~35 | | | SCHEDULED SHUTDOWN 9 | |
| SHAFT 2 | | | SCHEDULED SHUTDOWN 2 | OPERATING PERIOD 2 ~32 | | | SCHEDULED SHUTDOWN 6 | | OPERATING PERIOD 6 ~36 | | | SCHEDULED SHUTDOWN 10 |
| SHAFT 3 | | | | SCHEDULED SHUTDOWN 3 | OPERATING PERIOD 3 ~33 | | | SCHEDULED SHUTDOWN 7 | | OPERATING PERIOD 7 ~37 | | SCHEDULED SHUTDOWN 11 |
| SHAFT 4 | | | | | SCHEDULED SHUTDOWN 4 | OPERATING PERIOD 4 ~34 | | | SCHEDULED SHUTDOWN 8 | | OPERATING PERIOD 8 ~38 | SCHEDULED SHUTDOWN 12 |

FIG. 4

| PART NO. ~41 | CURRENT OPERATIONAL STATUS ~42 | TOTAL OPERATION TIME ~43 | CUMULATIVE OPERATION TIME AT THE PREVIOUS MAINTENANCE ~44 |
|---|---|---|---|
| PART 1 | SHAFT 2 | $X_1$ | $Y_1$ |
| PART 2 | SHAFT 1 | $X_2$ | $Y_2$ |
| PART 3 | SPARE | $X_3$ | $Y_3$ |
| PART 4 | SHAFT 4 | $X_4$ | $Y_4$ |
| PART 5 | UNDER MAINTENANCE | $X_5$ | $Y_5$ |
| PART 6 | DISUSED | $X_6$ | $Y_6$ |
| PART 7 | SHAFT 3 | $X_7$ | $Y_7$ |

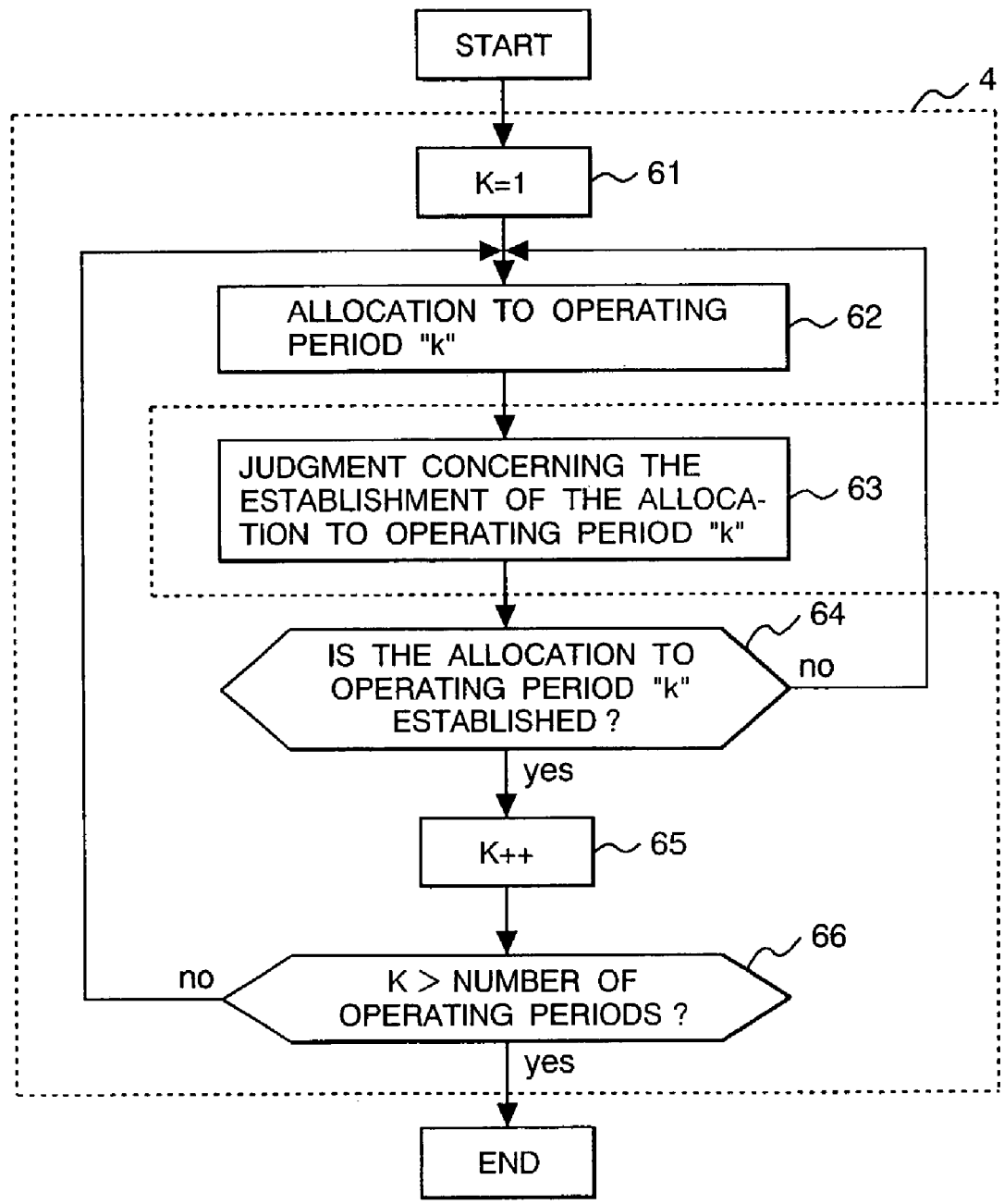

FIG. 7

| SHAFT ID | MONTH | THE YEAR 2002 | | | | | | | | THE YEAR 2003 | |
|---|---|---|---|---|---|---|---|---|---|---|---|
| | | MAR. | APR. | MAY. | JUN. | JUL. | AUG. | SEP. | OCT. | NOV. | DEC. | JAN. | FEB. |
| SHAFT 1 | | SCHEDULED SHUTDOWN 1 | OPERATING PERIOD 1 ~71 | | | SCHEDULED SHUTDOWN 5 | OPERATING PERIOD 5 ~75 | | | SCHEDULED SHUTDOWN 9 | |
| SHAFT 2 | | | SCHEDULED SHUTDOWN 2 | OPERATING PERIOD 2 ~72 | | | SCHEDULED SHUTDOWN 6 | OPERATING PERIOD 6 ~76 | | | SCHEDULED SHUTDOWN 10 |
| SHAFT 3 | | | | SCHEDULED SHUTDOWN 3 | OPERATING PERIOD 3 ~73 | | | SCHEDULED SHUTDOWN 7 | OPERATING PERIOD 7 ~77 | | SCHEDULED SHUTDOWN 11 |
| SHAFT 4 | | | | | SCHEDULED SHUTDOWN 4 | OPERATING PERIOD 4 ~74 | | | SCHEDULED SHUTDOWN 8 | OPERATING PERIOD 8 ~78 | SCHEDULED SHUTDOWN 12 |
| PART 1 | | | SHAFT 1 ~71a | | | REPLACEMENT ~81 "aaa" HOURS ~84 | | | | | |
| PART 2 | | | | SHAFT 2 ~72a | | MAINTENANCE ~79 | SHAFT 1 ~75a | | | REPLACEMENT ~82 "bbb" HOURS ~85 | |
| PART 3 | | | | | SHAFT 3 ~73a | MAINTENANCE ~80 | | | | | |
| PART 4 | | | | | SHAFT 4 ~74a | | | SHAFT 2 ~76a | | REPLACEMENT ~83 "ccc" HOURS ~86 | |
| PART 5 | | | | | | | | | SHAFT 3 ~77a | | |
| PART 6 | | | | | | | | | | SHAFT 4 ~78a | |

FIG. 8

| SHAFT ID | MONTH | THE YEAR 2002 | | | | | | | | THE YEAR 2003 | | |
|---|---|---|---|---|---|---|---|---|---|---|---|---|
| | | MAR. | APR. | MAY. | JUN. | JUL. | AUG. | SEP. | OCT. | NOV. | DEC. | JAN. | FEB. |
| SHAFT 1 | | SCHEDULED SHUTDOWN 1 | | OPERATING PERIOD 1 | | | SCHEDULED SHUTDOWN 5 | | OPERATING PERIOD 5 | | | SCHEDULED SHUTDOWN 9 | |
| SHAFT 2 | | | SCHEDULED SHUTDOWN 2 | | OPERATING PERIOD 2 | | | SCHEDULED SHUTDOWN 6 | | OPERATING PERIOD 6 | | SCHEDULED SHUTDOWN 10 |
| SHAFT 3 | | | | SCHEDULED SHUTDOWN 3 | | OPERATING PERIOD 3 | | | SCHEDULED SHUTDOWN 7 | | OPERATING PERIOD 7 | | SCHEDULED SHUTDOWN 11 |
| SHAFT 4 | | | | | SCHEDULED SHUTDOWN 4 | | OPERATING PERIOD 4 | | | SCHEDULED SHUTDOWN 8 | | OPERATING PERIOD 8 | SCHEDULED SHUTDOWN 12 |
| PART 1 | | | | | SHAFT 1 | | | REPLACEMENT "aaa" HOURS | | | | | |
| PART 2 | | | | | SHAFT 2 | | MAINTENANCE | | SHAFT 1 | | | REPLACEMENT "bbb" HOURS | |
| PART 3 | | | | | | SHAFT 3 | | MAINTENANCE | | | | | |
| PART 4 | | | | | | SHAFT 4 | | | SHAFT 2 | | | REPLACEMENT "ccc" HOURS | |
| PART 5 | | | | | | | | | SHAFT 3 | | | | |
| PART 6 | | | | | | | | | | | SHAFT 4 | | |

Labels: 111, 112, 112a, 113, 113a, 114, 115

FIG. 11

| SHAFT ID | MONTH | THE YEAR 2002 | | | | | | | | THE YEAR 2003 | | |
|---|---|---|---|---|---|---|---|---|---|---|---|---|
| | | MAR. | APR. | MAY. | JUN. | JUL. | AUG. | SEP. | OCT. | NOV. | DEC. | JAN. | FEB. |
| SHAFT 1 | | SCHEDULED SHUTDOWN 1 | OPERATING PERIOD 1 ~71 | | | SCHEDULED SHUTDOWN 5 | OPERATING PERIOD 5 ~75 | | | SCHEDULED SHUTDOWN 9 | | |
| SHAFT 2 | | | SCHEDULED SHUTDOWN 2 | OPERATING PERIOD 2 ~72 | | | SCHEDULED SHUTDOWN 6 | OPERATING PERIOD 6 ~76 | | | SCHEDULED SHUTDOWN 10 | |
| SHAFT 3 | | | | SCHEDULED SHUTDOWN 3 | OPERATING PERIOD 3 ~73 | | | SCHEDULED SHUTDOWN 7 | OPERATING PERIOD 7 ~77 | | | SCHEDULED SHUTDOWN 11 |
| SHAFT 4 | | | | | SCHEDULED SHUTDOWN 4 | OPERATING PERIOD 4 ~74 | | | SCHEDULED SHUTDOWN 8 | OPERATING PERIOD 8 ~78 | | | SCHEDULED SHUTDOWN 12 |

Box 101:

| | | |
|---|---|---|
| PART 1 | SHAFT 1 ~103 | REPLACEMENT "aaa" HOURS |
| PART 2 | SHAFT 2 ~104 / MAINTENANCE / SHAFT 1 | REPLACEMENT "bbb" HOURS |
| PART 3 | SHAFT 3 / MAINTENANCE | |
| PART 4 | SHAFT 4 / SHAFT 2 ~105 | REPLACEMENT "ccc" HOURS |
| PART 5 | SHAFT 3 | |
| PART 6 | SHAFT 4 | |

Box 102:

| | | |
|---|---|---|
| PART 1 | SHAFT 2 ~106 / SHAFT 2 ~108 | REPLACEMENT "ddd" HOURS |
| PART 2 | SHAFT 1 ~107 / MAINTENANCE / SHAFT 1 | REPLACEMENT "bbb" HOURS |
| PART 3 | SHAFT 3 / MAINTENANCE | |
| PART 4 | SHAFT 4 | |
| PART 5 | SHAFT 3 | |
| PART 6 | SHAFT 4 | |

FIG. 16

| SHAFT ID | MONTH | THE YEAR 2002 | | | | | | | | THE YEAR 2003 | | |
|---|---|---|---|---|---|---|---|---|---|---|---|---|
| | | MAR. | APR. | MAY. | JUN. | JUL. | AUG. | SEP. | OCT. | NOV. | DEC. | JAN. | FEB. |
| SHAFT 1 | | SCHEDULED SHUTDOWN 1 | OPERATING PERIOD 1 | | | SCHEDULED SHUTDOWN 5 | OPERATING PERIOD 5 | | | SCHEDULED SHUTDOWN 9 | | |
| SHAFT 2 | | | SCHEDULED SHUTDOWN 2 | OPERATING PERIOD 2 | | | SCHEDULED SHUTDOWN 6 | OPERATING PERIOD 6 | | | SCHEDULED SHUTDOWN 10 | |
| SHAFT 3 | | | | SCHEDULED SHUTDOWN 3 | OPERATING PERIOD 3 | | | SCHEDULED SHUTDOWN 7 | OPERATING PERIOD 7 | | | SCHEDULED SHUTDOWN 11 |
| SHAFT 4 | | | | | SCHEDULED SHUTDOWN 4 | OPERATING PERIOD 4 | | | SCHEDULED SHUTDOWN 8 | OPERATING PERIOD 8 | | SCHEDULED SHUTDOWN 12 |
| PART 1 | | | SHAFT 1 | | REPLACEMENT | | | | | | | |
| PART 2 | | | | SHAFT 2 | | MAINTENANCE (183a) | | SHAFT 1 | | REPLACEMENT | | |
| PART 3 | | | | SHAFT 3 | | MAINTENANCE (184a) | | | | | | |
| PART 4 | | | | | SHAFT 4 | | | SHAFT 2 | | REPLACEMENT | | |
| PART 5 | | | | | | | | SHAFT 3 | | MAINTENANCE (185a) | | |
| PART 6 | | | | | | | | SHAFT 4 | | MAINTENANCE (186a) | | |

182

| MAINTENANCE OPERATIONS | MONTH | THE YEAR 2002 | | | | | | | | THE YEAR 2003 | | |
|---|---|---|---|---|---|---|---|---|---|---|---|---|
| | | MAR. | APR. | MAY. | JUN. | JUL. | AUG. | SEP. | OCT. | NOV. | DEC. | JAN. | FEB. |
| OPERATION 1 | 188 | | | | | | PART 2 FOR SITE 1 (183b) | | PART 3 FOR SITE 1 (184b) | PART 6 FOR SITE 1 (185b) | |
| OPERATION 2 | 189 | | | | | | | | | | PART 5 FOR SITE 1 (186b) | |

| SHAFT ID | MONTH | THE YEAR 2002 | | | | | | | | THE YEAR 2003 | | |
|---|---|---|---|---|---|---|---|---|---|---|---|---|
| | | MAR. | APR. | MAY. | JUN. | JUL. | AUG. | SEP. | OCT. | NOV. | DEC. | JAN. | FEB. |
| SHAFT 1 | | SCHEDULED SHUTDOWN 1 | OPERATING PERIOD 1 | | | SCHEDULED SHUTDOWN 5 | | OPERATING PERIOD 5 | | | SCHEDULED SHUTDOWN 9 | | |
| SHAFT 2 | | | SCHEDULED SHUTDOWN 2 | OPERATING PERIOD 2 | | | SCHEDULED SHUTDOWN 6 | | OPERATING PERIOD 6 | | | SCHEDULED SHUTDOWN 10 | |
| SHAFT 3 | | | | SCHEDULED SHUTDOWN 3 | OPERATING PERIOD 3 | | | SCHEDULED SHUTDOWN 7 | | OPERATING PERIOD 7 | | | SCHEDULED SHUTDOWN 11 |
| SHAFT 4 | | | | | SCHEDULED SHUTDOWN 4 | OPERATING PERIOD 4 | | | SCHEDULED SHUTDOWN 8 | | OPERATING PERIOD 8 | | SCHEDULED SHUTDOWN 12 |
| PART 1 | | | | SHAFT 2 | | | MAINTE-NANCE (192a / 191a) | SHAFT 2 (193a) | | | | REPLACE-MENT | |
| PART 2 | | | | | SHAFT 4 | | | | SHAFT 1 | | | REPLACE-MENT | |
| PART 3 | | | | SHAFT 3 | | | MAINTE-NANCE (195a / 194a) | SHAFT 4 (196a) | | | | | |
| PART 4 | | | | SHAFT 1 (198a) | | MAINTE-NANCE (197a) | | SHAFT 3 (199a) | | | | | |

~190

| MAINTENANCE STARTING TIME AND PART DELIVERY TIME | MONTH | THE YEAR 2002 | | | | | | | | THE YEAR 2003 | | |
|---|---|---|---|---|---|---|---|---|---|---|---|---|
| | | MAR. | APR. | MAY. | JUN. | JUL. | AUG. | SEP. | OCT. | NOV. | DEC. | JAN. | FEB. |
| PART 1 FOR SITE 2 | | | | | | | | 192a | 193a | | | | |
| PART 3 FOR SITE 2 | | | | | | | | | | 195a | 196a | | |
| PART 4 FOR SITE 2 | | | | | | | 198a | | 199a | | | | |

~200

| MAINTE-NANCE OPERA-TIONS | MONTH | THE YEAR 2002 | | | | | | | | THE YEAR 2003 | | |
|---|---|---|---|---|---|---|---|---|---|---|---|---|
| | | MAR. | APR. | MAY. | JUN. | JUL. | AUG. | SEP. | OCT. | NOV. | DEC. | JAN. | FEB. |
| OPERATION 1 | | 188 | | | | | | PART 2 FOR SITE 1 (183b) | PART 1 FOR SITE 2 (191b) | PART 3 FOR SITE 1 (184b) | PART 6 FOR SITE 1 (185b) | | |
| OPERATION 2 | | 189 | | | | | | | PART 4 FOR SITE 2 (197b) | PART 3 FOR SITE 2 (194b) | PART 5 FOR SITE 1 (186b) | | |

| SHAFT ID | MONTH | THE YEAR 2002 | | | | | | | | | THE YEAR 2003 | |
|---|---|---|---|---|---|---|---|---|---|---|---|---|
| | | MAR. | APR. | MAY. | JUN. | JUL. | AUG. | SEP. | OCT. | NOV. | DEC. | JAN. FEB. |
| SHAFT 1 | | SCHEDULED SHUTDOWN 1 | | OPERATING PERIOD 1 | | | SCHEDULED SHUTDOWN 5 | OPERATING PERIOD 5 | | | SCHEDULED SHUTDOWN 9 | |
| SHAFT 2 | | | SCHEDULED SHUTDOWN 2 | | OPERATING PERIOD 2 | | | SCHEDULED SHUTDOWN 6 | OPERATING PERIOD 6 | | | SCHEDULED SHUTDOWN 10 |
| SHAFT 3 | | | SCHEDULED SHUTDOWN 3 | | OPERATING PERIOD 3 | | | SCHEDULED SHUTDOWN 7 | OPERATING PERIOD 7 | | | SCHEDULED SHUTDOWN 11 |
| SHAFT 4 | | | | SCHEDULED SHUTDOWN 4 | | OPERATING PERIOD 4 | | | SCHEDULED SHUTDOWN 8 | OPERATING PERIOD 8 | | SCHEDULED SHUTDOWN 12 |
| PART 1 | | | | SHAFT 2 | | | MAINTE- NANCE | | SHAFT 2 | | | REPLACE- MENT |
| PART 2 | | | | | SHAFT 4 | | | | SHAFT 1 | | | REPLACE- MENT |
| PART 3 | | | | SHAFT 3 | | | MAINTE- NANCE | | SHAFT 4 | | | |
| PART 4 | | | SHAFT 1 | | | MAINTE- NANCE | | | SHAFT 3 | | | |

241
243
242

HISTORY DISPLAY RELATING TO PART 2

| PART 2 | HISTORY 1 | OPERATION TIME #1 | MAINTE- NANCE 1 | MAINTENANCE PERIOD 1 | HISTORY 2 | ... |
|---|---|---|---|---|---|---|
| INDEPENDENT PART 1 | SHAFT 1 | "sss" HOURS | COATING | "ttt" MONTHS | | |
| INDEPENDENT PART 2 | | | | | | |
| INDEPENDENT PART 3 | | | | | | |
| INDEPENDENT PART 4 | | | | | | |
| INDEPENDENT PART 5 | | | | | | |
| INDEPENDENT PART 6 | | | | | | |
| INDEPENDENT PART 7 | | | | | | |
| INDEPENDENT PART 8 | | | | | | |
| INDEPENDENT PART 9 | | | | | | |
| INDEPENDENT PART 10 | | | | | | |
| INDEPENDENT PART 11 | | | | | | |
| INDEPENDENT PART 12 | | | | | | |
| | | | | | | |

244

ROTATION PLANNING APPARATUS AND ROTATION PLANNING SYSTEM

BACKGROUND OF THE INVENTION

1. Field of the Invention

The present invention relates to the planning apparatuses or planning-systems relating to the maintenance (including repair and replacement) of the parts used in gas turbines or the like.

2. Prior Art

The lives of the parts used in gas turbines or the like, especially, the lives of high-temperature parts, are determined, with the deterioration characteristics of the part materials taken into consideration, as the time over which the parts can withstand the operation of the gas turbines (that is to say, service life in the number of hours), and to operate the gas turbines over the time exceeding the lives of their parts, these parts need to be replaced with new ones. Also, parts of the types that suffer particularly significant deterioration require maintenance at fixed hours of operation, until the parts have reached the respective lives.

In thermal plants, for example, a scheduled shutdown period for periodic inspection and other maintenance purposes is provided for each fixed operating period in order to maintain the normality of the gas turbines, and the parts constituting various equipment are to be checked during these periods. During the checks, each part whose life has been reached or whose service life in the maintenance period also requires maintenance such as repair or replacement.

Up to now, rotation plans have been set up by manual operations and manual calculation when such a rotation scheme is to be adopted for operation. However, as described above, since the maintenance of the high-temperature parts used in gas turbines or the like needs to be planned considering the maintenance required at fixed periods, manual planning has been a task very high in workload.

Whether the parts are to be repaired or replaced can be judged from the current information relating to the parts of the gas turbines and from actual result data relating to the corresponding plant, and the art for enabling this is disclosed in Japanese Application Patent Laid-Open Publication No. Hei 10-196403.

SUMMARY OF THE INVENTION (Problems to be Solved by the Invention)

The method disclosed in Japanese Application Patent Laid-Open Publication No. Hei 10-196403, however, assumes part repair and replacement plans with respect to one shaft, and this method is left with problems about the means of allocating a plurality of parts to a plurality of shafts or plants and planning the rotation of the parts usage. More specifically, the number of parts which the person controlling a plurality of shafts or plants is to stock increases, and this forms one of the problems remaining unsolved in connection with the prior art mentioned above.

For these reasons, a first object of the present invention is to provide the planning apparatuses or planning systems intended to efficiently set up plans for part usage rotation between a plurality of shafts or plants.

A second object of the present invention is to provide a rotation planning system by which a manufacturer or service provider who produces the parts of a plurality of plants and/or performs maintenance operations can not only implement planned production and manufacture by rapidly understanding the maintenance (including replacement and repair) plans relating to each plant, but also conduct more economical production activities and supply less expensive parts to the user.

(Means for Solving the Problems)

A first means for attaining the above first object is characterized in that the first means comprises: an operation schedule input section for accepting the input of an operation schedule relating to at least either of a plurality of shafts or plants; a part type/attribute input section for accepting the input of information relating to at least either the types or attributes of parts; a part information input section for accepting the input of part information; a part allocation processing section for allocating parts to an operation schedule relating to at least either of the foregoing plurality of shafts or plants, in accordance with the outputs of said operation schedule input section, said part type/attribute input section, and said part information input section, and; an allocation establishment judging section for judging the establishment of the allocation process from the output of said part allocation processing section.

Also, a second means for attaining the above first object is characterized in that the second means comprises: an operation schedule input section for accepting the input of an operation schedule relating to at least either of a plurality of shafts or plants; a part type/attribute input section for accepting the input of information relating to at least either the types or attributes of parts; a part information input section for accepting the input of part information; a part allocation processing section for allocating parts to an operation schedule relating to at least either of the foregoing plurality of shafts or plants, in accordance with the outputs of said operation schedule input section, said part type/attribute input section, and said part information input section; an allocation establishment judging section for judging the establishment of the allocation process from the output of said part allocation processing section, and; an evaluation function calculating section for conducting evaluation calculations based on at least the outputs of said part allocation processing section and said allocation establishment judging section.

In addition, the first or second means is characterized in that it further has a splitting rule input section for entering part allocation rules into said part allocation processing section.

Furthermore, the second means is characterized in that when evaluations and calculations are conducted by said evaluation function calculating section in accordance with the outputs of said part allocation processing section and said allocation establishment judging section, the sum of the residual lives of parts is used as an evaluation function.

Furthermore, the first or second means is characterized in that at said part allocation processing section, parts smaller in part number are allocated in normal ascending order of the starting date of the operating period of either of said plurality of shafts or plants, and in that part allocation to one operating period and the judgment relating to the establishment of the allocation are continuously conducted to determine the allocation of parts in normal ascending order of the starting date of the operating period.

Besides, the second means is characterized in that a plurality of operation plans relating to all operating periods for which the allocation establishment judgment has been established are set up and in that evaluation data on each operation plan is calculated by said evaluation function calculating section.

The means for attaining the above second object is characterized in that the setup of rotation plans concerning a plurality of plants is accomplished by connecting each plant and either of the plurality of means characterized above, by use of a communications means such as the Internet, and operating the rotation planning apparatus from each plant via the communications means.

BRIEF DESCRIPTION OF THE DRAWINGS

FIG. 3 is a diagram showing in a chart format the schedule information entered via the schedule information input means.

FIG. 4 is a diagram showing an example of the initial status of parts 1 to 7.

FIG. 6 is a diagram explaining the flow of processing during rotation planning by part allocation processing means 4 and allocation establishment judging means 5.

FIG. 7 is a diagram showing an example of display by plan display means 6.

FIG. 8 is a diagram showing another embodiment of plan display means 6.

FIG. 11 is a diagram showing an example of details of display by the plan display means 6 pertaining to embodiment 2.

FIG. 16 is a diagram explaining an embodiment of maintenance plan setup means 162.

FIG. 17 is a diagram explaining another embodiment of maintenance plan setup means 162.

FIG. 22 is a diagram showing an example of display in order to explain an embodiment of history reference means 240.

DETAILED DESCRIPTION OF THE INVENTION

The rotation planning methods and rotation planning apparatuses pertaining to the present invention are described below using FIGS. 1 to 24.

Embodiment 1

Figures 1, 2:
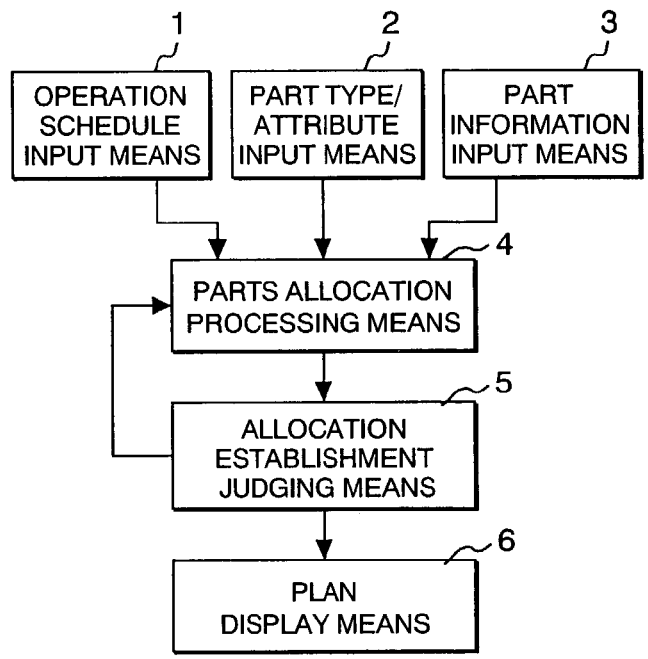
FIG. 1 is a block diagram showing the configuration of the rotation planning apparatus pertaining to embodiment 1.
FIG. 2 is a diagram showing an example of the schedule information entered via the schedule information input means.

FIG. 1 is a block diagram showing the outline of the processes conducted by the rotation planning apparatus pertaining to the present embodiment. The rotation planning apparatus pertaining to the present embodiment conducts the processes by use of the plurality of means shown in FIG. 1. First, the present embodiment is outlined using FIG. 1.

The processes shown in FIG. 1 use at least an operation schedule input means 1, a part type/attribute input means 2, a part information input means 3, a part allocation processing means 4, an allocation establishment judging means 5, and a plan display means 6. Although, in the present application specification, each of these means is assigned a name for the convenience of description, as long as the processes outlined below are performed, the present invention is not limited by the names of the processing means. In the present embodiment, the operation schedule input means 1 accepts the input of the schedule information relating to the operation and inspection-purpose shutdown of the plurality of shafts or plants whose operation is to be planned, and then sends the corresponding information to the part allocation processing means. The part type/attribute input means 2 accepts the input relating to the life, the maintenance period required, and other attributes of each part that have been predetermined according to the particular type of part, and then sends the corresponding information to the part allocation processing means 4. The part information input means 3 accepts the input of initial status information on the operational status existing during the start of rotation planning for the parts whose usage is to be rotated, and on the operational status existing for each operation time count, and then sends the corresponding information to the part allocation processing means 4. The part allocation processing means 4 allocates the appropriate parts to the information on the operating periods of each shaft or plant that has been received from the operation schedule input means 1, in accordance with the attribute information of each part that has been received from the part type/attribute input means 2, and with the initial status information that has been received from the part information input means 3. The operating periods of each shaft or plant can also be calculated from directly entered information or from the scheduled shutdown periods that have been entered for each shaft or plant. The allocation establishment judging means 5 accepts the input of the results of the allocation executed by the part allocation processing means 4, and then judges the presence/absence of discrepancies in the operation plan. The plan display means 6 displays allocation establishment information based on the process that has been performed by the allocation establishment judging means 5. For example, the part allocations in the rotation plan, the total operation time of each part, and the time when the part is to undergo maintenance such as replacement, are displayed on a display screen or the like.

Next, details of the present embodiment are described below using FIGS. 1 to 8. This description assumes a single-stage rotor blade as an example of the part type, and shows an example in which the use of seven such parts is to be rotated for a gas turbine equipped with four shafts. In an actual single-stage rotor blade, the plurality of independent parts in the rotor blade are handled as one set built into the rotor. The parts 1, 2, etc. called in this description, however, shall each refer to one set of parts for the sake of simplicity. Similarly, hereinafter, the other types of parts to be assembled as one set into one shaft, are also handled as one part. In addition, although the term "operation time" is used throughout the remainder of this SPECIFICATION, this term can be directly substituted for the "equivalent operation time" converted from a previously set coefficient with the operating load taken into consideration. Even in this detailed description, the present embodiment is not limited by the number of shafts or parts used in the corresponding gas turbine.

The operation schedule input means 1 accepts the input of the schedule information relating to the operation and inspection-purpose shutdown of the plurality of shafts or plants whose operation is to be planned, and then sends the corresponding information to the part allocation processing means. An example of entered schedule information is shown in FIG. 2.

FIG. 2 shows schedule information relating to inspection-purpose shutdown (scheduled shutdown), and listed under columns 21, 22, 23, and 24 are the names of the shafts to undergo scheduled shutdown, the names of the scheduled shutdown processes, the starting dates of the scheduled shutdown processes, and the ending dates thereof, respectively.

FIG. 3 is a re-representation of the above schedule information, based on the information of FIG. 2, and a timebase and the name of the shaft are shown on the horizontal axis and the vertical axis, respectively. Here, if operation is to be continued except during shutdown periods, the operating period 1 of shaft 1, for example, ranges from April 6, namely, the day after the ending date of scheduled shutdown process 1, to July 4, namely, the day before the starting date of scheduled shutdown process 5. Hereby, such schedule information as shown in FIG. 3 can be obtained.

The part type/attribute input means 2 accepts the input relating to the life, the maintenance period required, the costs required for maintenance, and other attributes of each part that have been predetermined according to the particular type of part, and then sends the corresponding information to the part allocation processing means 4. The attributes entered here are those determined by the types of parts, such as combustor parts, rotor blades, or shrouds, and in terms of rotation planning procedure, attribute data becomes one of restrictions on operation planning. The attribute input items in this case include, for example: (1) part life, (2) for the parts that require maintenance, the service life of each part between maintenance operations that denotes the continuous operating period required for maintenance, (3) the maintenance period that denotes the period required for maintenance, and so on.

The part information input means 3 accepts the input of information on the initial status of the parts whose usage is to be rotated, such as the operational status of these parts during the start of rotation planning and for each operation time count, and then sends the corresponding information to the part allocation processing means 4. FIG. 4 shows an example of the initial status of parts 1 to 7.

Listed under the columns 41, 42, 43, and 44 of FIG. 4 are part numbers, the operational status during the start of rotation planning, the total operation time during the start of rotation planning, and the cumulative operation time at up to the previous maintenance, during the start of rotation planning, respectively. The current operational status listed under column 43 denotes that either shaft or plant is either in operation, under maintenance, or has been disused by replacement to a spare.

The part allocation processing means 4 allocates the appropriate parts to the information on the operating periods of each shaft or plant that has been received from the operation schedule input means 1, in accordance with the attribute information of each part that has been received from the part type/attribute input means 2, and with the initial status information that has been received from the part information input means 3. That is to say, rotation in the periods that have been entered from the operation schedule input means 1 is planned on the basis of the inputs from the part type/attribute input means 2 and the part information input means 3. Rotation planning is described in further detail below using FIG. 3. In the operating periods 31 to 38 in FIG. 3 that are determined by the scheduled shutdown periods and other information entered from the operation schedule input means 1, the parts shown in FIG. 4 are allocated as the parts that are to be actually used. The part allocation processing means may repeat the part allocation process according to the particular output of the allocation establishment judging means 5. Checking whether parts have been allocated to all entered operating periods is another function of the part allocation processing means.

The allocation establishment judging means 5 accepts the input of the results of the allocation executed by the part allocation processing means 4, and then judges the presence/absence of discrepancies in the operation plan. More specifically, the allocation establishment judging means judges whether the parts that have been allocated by the part allocation processing means 4 can be put into operation during the allocated operating periods. Judgment conditions include:

(1) Whether the part is kept as a spare during the operating period to which that part has been allocated (Whether the part is assembled into either shaft or is under maintenance)

(2) Whether the sum of the operating period to which the part has been allocated, and the total operation time of the part, namely, the value obtained by adding both, is in excess of the life of that part in the number of hours (3) If the part requires maintenance at fixed periods, whether the sum of the operating period to which the part has been allocated, and the cumulative operation time of the part at up to the previous maintenance, namely, the value obtained by adding both, is in excess of the maintenance-period service life of that part in the number of hours.

When it is judged from these conditions that operation is possible, the allocation establishment judging means 5 judges part allocation to have been established.

Here, the judgment process of the allocation establishment judging means 5 is described in further detail below using the process flow diagram of FIG. 5. This diagram shows an example in which the allocation establishment judging processes are performed on part I with respect to operating period "k" in the case that part I is already allocated to operating period "j".

First, process 51 is performed to calculate the total operation time of part I at the end of the operating period "k". The calculation can be conducted by adding the operation time of the operating period "k" to the total operation time of part I at the end of the operating period "j". The total operation time of part I at the end of the operating period "j" can likewise be calculated by adding the total operation time existing at the start of rotation planning (see FIG. 4), and the residual period from the start thereof to the end of the operating period "j". Of course, the above calculation can likewise be conducted by entering the total operation time of part I at the start of the operating period "j" and then adding the operation time of the operating period "j".

Process 52 is performed to calculate the after-maintenance operation time of part I existing at the end of the operating period "k". This number of hours can be calculated by storing the operation time of part I existing at the previous maintenance, into a memory, and then subtracting this value from the total operation time of part I that was calculated in process 51. Process 52 is required only for the types of parts that require maintenance at fixed time periods.

Process 53 is performed to judge whether the part I is a spare at the start of the operating period "k". When the part is a spare at the starting date of that operating period, the judgment process proceeds to process 54, described below. When the part is not such a spare, however, the judgment process ends. This judgment process is intended to judge that the other operating periods to which the part I has been allocated do not overlap the operating period "k".

Process 54 is performed to judge whether the part I requires maintenance at the start of the operating period "k". More specifically, whether the part is of the type which requires maintenance at fixed time periods, and whether the after-maintenance operation time of part I that was calculated in process 52 is longer than the service life of the part between maintenance operations are the criteria for the above judgment. When the after-maintenance operation time of part I is longer than its service life between maintenance operations, since the allocation of part I to operating period "k" causes the service life of the part between maintenance operations to be exceeded, a maintenance period must be provided in front of operating period "k". For the parts that require maintenance each time the shaft or the plant is shut down for inspection, the judgment results in this process unconditionally become "Yes" (maintenance required), irrespective of the operating period. Conversely, for the parts that do not require maintenance, judgment results become "No" and the sequence skips to process 58.

In process 55, maintenance is set in front of the operating period "k" of part I, on the basis of the judgment results in process 54.

When it is judged in process 54 that maintenance needs to be set in front of the operating period "k", it will be further judged in process 56 whether the maintenance of part I will have been completed by the starting date of the operating period "k". In this judgment process, it is to be confirmed that the period from the end of the operating period "j" to which the part I has been allocated, to the start of the operating period "k", is longer than the period required for the maintenance of the part I. If judgment results are "Yes" (maintenance required), the sequence skips to process 58, and if the results are "No", the sequence proceeds to process 57. In the latter case, that is to say, if, in process 56, the maintenance period required cannot be provided in front of the operating period "k", since this does not satisfy the operational restrictions of the part I, it will be judged in process 57 that part I cannot be allocated to operating period "k", and appropriate processing will correspondingly occur. Hereby, the allocation of part I to the operating period will be terminated.

In process 58, it is judged whether the total operation time of part I that was calculated in process 51 is shorter than the life of the part. More specifically, it is judged whether the life of part I is exceeded as a result of its use in operating period "k". If the life is exceeded, the sequence proceeds to process 59. If the life is not exceeded, the sequence skips to process 60. Since it is judged in process 58 that if part I is used in operating period "k", the life of the part will be exceeded, it is judged in process 59 that after part I has been changed for another part, the new part I can be allocated to operating period "k". Hereby, the allocation of part I to operating period "k" is terminated.

Process 60 is performed only when it is judged whether the life of part I is not exceeded as a result of its use in operating period "k". When process 60 is completed, therefore, since this means that part I satisfies all the above conditions, it is judged that part I can be allocated to operating period "k". Hereby, the allocation of part I to operating period "k" is completed.

Figure 5:
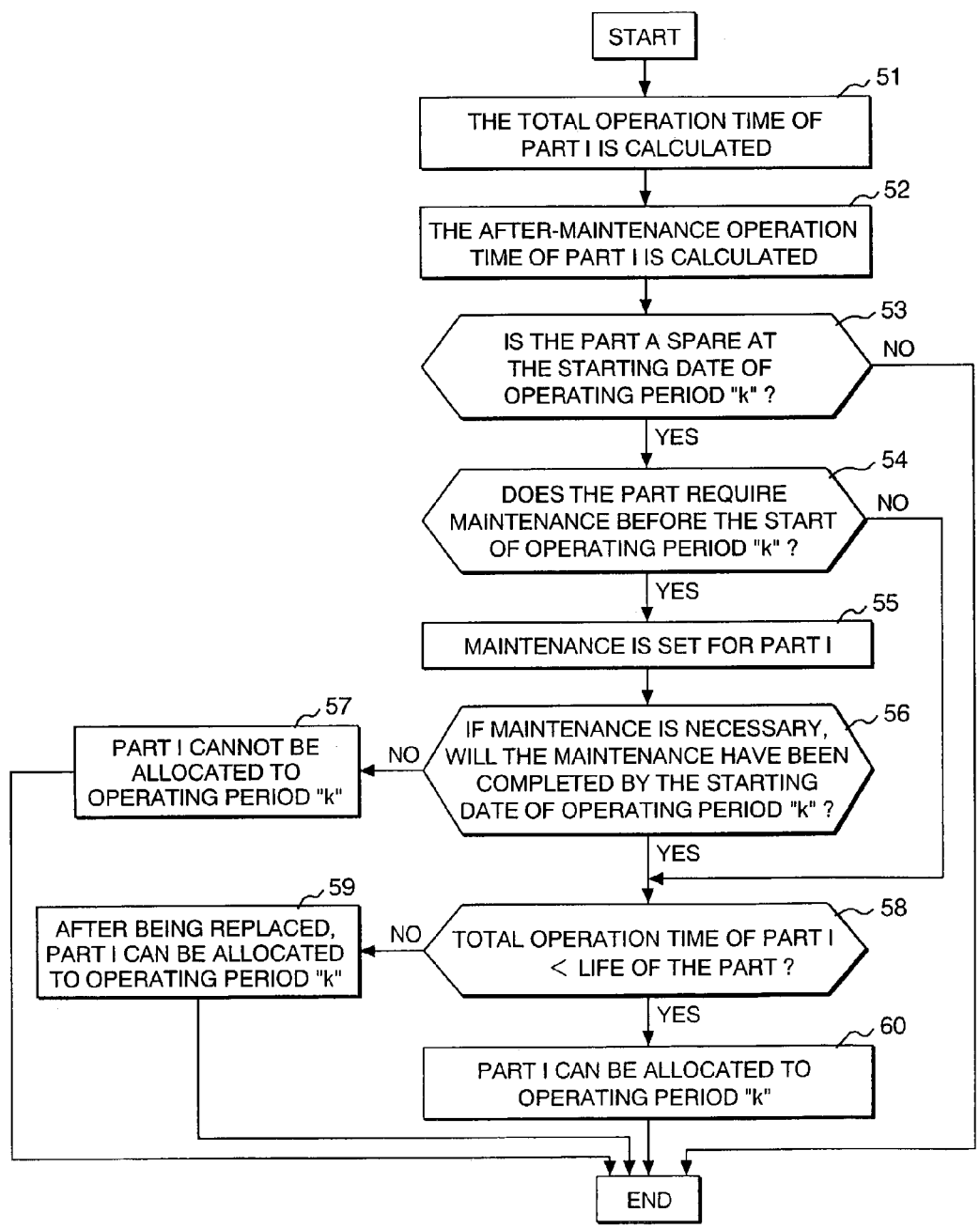
FIG. 5 is a process flow diagram explaining the judgment process of the allocation establishment judging means.

Since the processes exemplified in FIG. 5 are performed in this way, it is possible not only to judge whether the allocation of parts by the part allocation processing section is actually possible, but also to judge, from the life of each part and its service life between maintenance operations, whether the repair, replacement, or other maintenance operations that precede the operating period of each part need to be performed. In addition, it is possible to determine the replacement or maintenance timing of the parts which require replacement or maintenance, and to set up efficient rotation plans.

Of course, the invention pertaining to the present application is not limited by the above restrictions. For example, if there are other restrictions such as those dictating that the same parts should not be used for the same shaft, it is possible to set the allocation of the parts satisfying these restrictions, and to set up efficient rotation plans, by adding the corresponding restrictions to the judgment results of the allocation establishment judging means 5 as required.

Next, the flow of rotation-planning processes by part allocation processing means 4 and allocation establishment judging means 5 is described using FIG. 6.

The process flow diagram of FIG. 6 assumes the setup of a rotation plan for the case that when a plurality of shafts have independent operating periods (see FIG. 3), parts are to be allocated to the respective operating periods. Of all processes shown in the figure, only processes 61, 62, 64, 65, and 66 boxed with a discontinuous line in the figure are performed by part allocation processing means 4. Although not shown in the figure, process 63 is performed by allocation establishment judging means 5. In the present embodiment, for the convenience of explanation, operating periods are numbered "1", "2", etc. in normal ascending order of the starting date of the operating period.

In process 61, counter K of the operating period is initialized to 1.

In process 62, any part I is allocated to operating period "k" by part allocation processing means 4.

In process 63, judgments on allocation establishment are conducted by allocation establishment judging means 5. Process 63 is one of the processes described above using FIG. 5.

In process 64, it is judged whether the allocation to operating period "k" has been established as a result of the judgment in process 63. If the allocation has been established, the sequence proceeds to process 65, and if the allocation has not been established, the sequence returns to process 62.

In process 65, the counter of the operating period "k" to which the part is to be allocated undergoes data processing based on the allocation establishment judgment results with respect to operating period "k".

In process 66, it is judged whether the value of the operating period counter K has exceeded the number of operating periods for which the rotation plan is to be established. If the value of the counter K has exceeded the number of operating periods, processing is completed since allocation to all operating periods is regarded as having been completed. If the counter value is less than the number of operating periods, since allocation is not completed, the sequence returns to process 62 and then process 62 onward is repeated.

A rotation plan that satisfies the operational restrictions of the corresponding part type can be set up by performing the above processes.

What type of rotation plan can be set up through the processes shown in FIG. 6 depends on the operation of the part allocation processing means 4, and various rotation plan can be established. For example, the rules of allocation by part allocation processing means 4 can be set in a variety of forms, including a format in which, for example, when the allocation rules are set in normal ascending order of the part number, part allocation processing means 4 can establish a rotation plan with higher priority being assigned in order of the part number, namely, with priority being assigned to parts 1, 2, 3, etc. in that order. Or the rules can be set so that parts are allocated preferentially in normal ascending order of the length of residual part life or in descending order thereof or in order of the less significant difference between residual part life and the operating period. Or random allocation without rules is also possible. These allocation rules (including the evaluation data desired by the user) can be assigned by being entered from a splitting rule input means (not shown in the figure) into the part allocation processing means.

Next, plan display means 6 is described. The plan display means 6 displays allocation establishment information based on the process that has been performed by the allocation establishment judging means 5. For example, the part allocations in the rotation plan, the total operation time of each part, and the time when the part is to undergo maintenance such as replacement, are displayed on a display screen or the like.

An example of display by plan display means 6 is shown in FIG. 7. The horizontal axis in FIG. 7 is a timebase, and in the upper row of the vertical axis are displayed the scheduled inspection-purpose shutdown and operating periods that have been entered into operation schedule input section 1 for each shaft, and in the lower row of the vertical axis are displayed the rotation cycles of the parts which have been allocated as a result of rotation planning. Numerals 71 to 78 in FIG. 7 denote the operating periods required for the allocation of the parts, and numerals 71a to 78a in FIG. 7 denote the rotation plans that have been set up for each part. The example in FIG. 7 indicates that numeral 71a is assigned to operating period 1 shown as 71, and numeral 72a, to operating period 2 shown as 72. Other information displayed by plan display means 6 includes the times of maintenance or replacement 84-86 that are determined by allocation establishment judging means 5. Numerals 79 and 80, for example, denote maintenance periods, and numerals 81 to 83 each denote the time of part replacement. Since the total operation time of each part is calculated by allocation establishment judging means 5, the total operation time of the corresponding part at its replacement can also be displayed.

Not only a function that refers to the results, but also a function that introduces on-screen changes in displayed rotation plans in a dialog format and refers to the results in that screen mode can be added as the functions of the plan display means 6. These functions are described below using more specific examples.

FIG. 8 is an example of a display screen mode relating to an established rotation plan, and the arrow shown by numeral 111 in FIG. 8 denotes a pointing device, such as mouse, that enables the selection of any position on the screen.

For example, it is possible, by using the pointing device, to select line 112 which denotes the ending date of scheduled shutdown process 6, from the schedule information displayed on the screen, and move the position of the ending date to the left or the right. After being moved, when line 112 has its position defined, the ending date of scheduled shutdown process 6 can be regarded as having been changed to, for example, the date denoted by numeral 112a. When the change operations on the above schedule are accepted, items related to the ending date of scheduled shutdown process 6 that is shown as line 112 in the displayed rotation plan will also be correspondingly modified. In this example, items related to the ending date of scheduled shutdown process 6 are the schedule shown as the numeral 113 denoting the starting date of use of part 4 for a shaft 2, and the total operation time (denoted by numeral 113) of part 4 that is changed by the change of the schedule. More specifically, when schedule 112 is changed to a schedule 112a, the ending date denoted by numeral 113 will be moved to the position of numeral 113a which denotes the same date, then the differential total operation time derived from the difference between the values shown as 113 and 113a will be calculated, and the calculated value will be displayed as the value denoted by numeral 115.

In this way, in the plan display section, modification results can also be displayed according to the particular schedule changes from the user by linking, beforehand, all date information represented by the vertical lines on the display screen, to the other dates on the display screen and the operation information calculated from dates. In addition, it is possible to re-enter information into operation schedule input means 1 on the basis of the change using the pointing device, re-establish a rotation plan, and display the results.

In this example of screen display, arrow 114 in FIG. 8 indicates the range in which the date denoted by numeral 113 can be changed. If this range is overstepped, since the operating period will overlap other operating periods of part 4, the corresponding operation plan will not be established. In order to prevent this from occurring, it is also possible to determine the modification range for each schedule so that operation is established, and to add such a function that activates an alarm buzzer in case of the determined range being overstepped.

Although an example of making schedule changes by mouse operations has been described in the present embodiment, the embodiment is not always limited by this example; it is also possible to use other methods such as selecting schedules and then updating dates.

It becomes possible, by configuring the present invention as described above, to set up rotation plans relating to the use of the spare parts consisting of the number of shafts and an "n" number of parts, for a plurality of shafts, and display the results. Also, the person controlling a plurality of shafts can operate each shaft efficiently with a smaller number of parts, and loads associated with rotation planning can be significantly reduced.

Embodiment 2

Next, a second embodiment of the invention pertaining to the present application is described.

Figure 9:
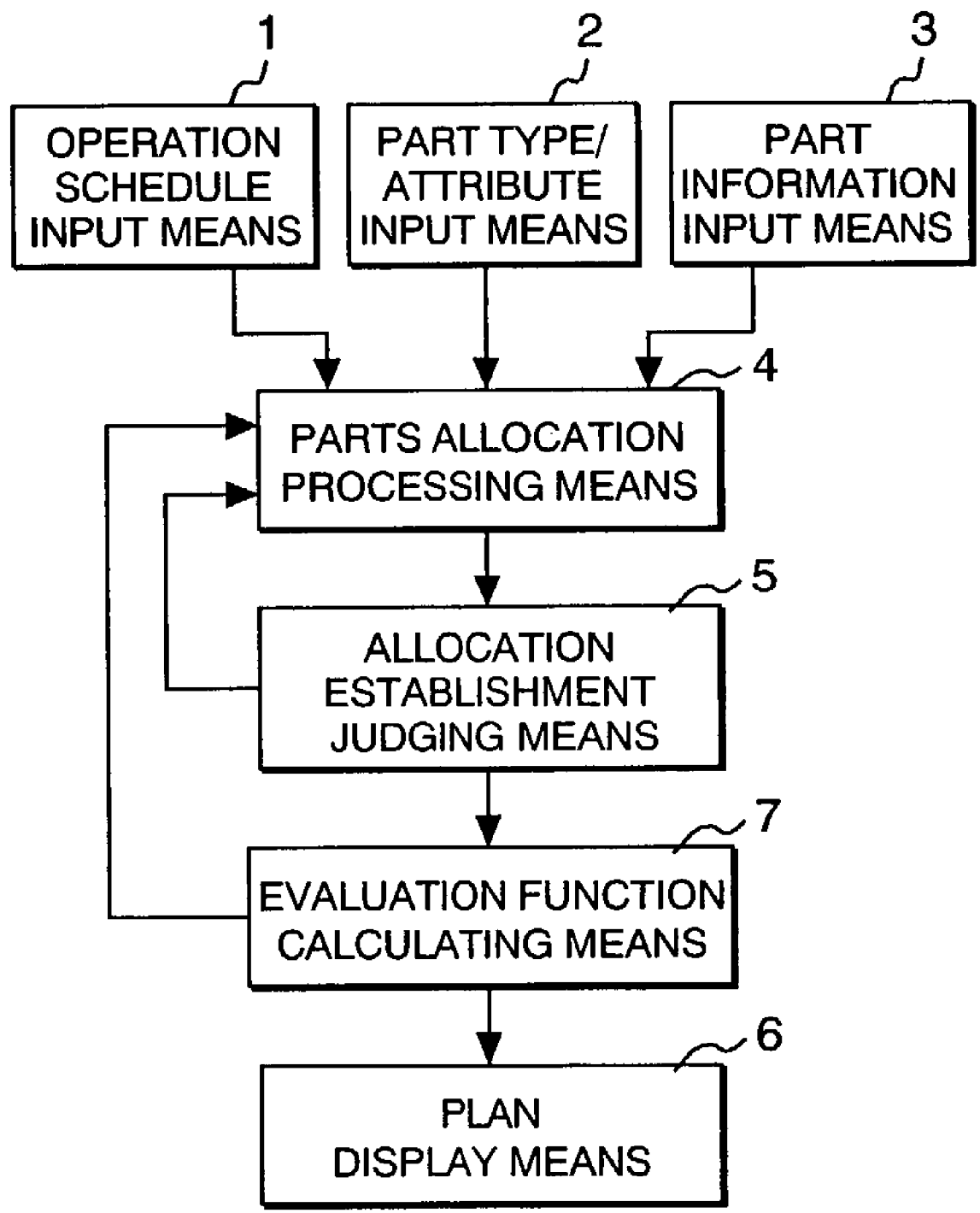
FIG. 9 is a block diagram showing the configuration of the rotation planning apparatus pertaining to embodiment 2.

FIG. 9 is a block diagram showing the outline of the processes conducted by the rotation planning apparatus pertaining to the present embodiment. The block diagram of FIG. 9 shows the apparatus configuration having an evaluation function calculating means 7 added between the allocation establishment judging means 5 and plan display means 6 shown in the block diagram of FIG. 1.

The evaluation function calculating means 7 performs evaluation data calculations on the rotation plans that have been set up via part allocation processing means 4 and allocation establishment judging means 5. The use of the invention pertaining to the present application enables a plurality of part rotation plans to be established. When a plurality of plans are present, evaluation data for evaluating which plan is better is required. In evaluation function calculating means 7, therefore, evaluation data calculations are performed on established rotation plans and then each calculated evaluation value is displayed at plan display means 6 to enable the user to refer to the evaluation data for the respective plans and automatically or manually select the plans that seem to be better. Also, the rotation plan having the best evaluation data in the system can be selected and displayed at plan display means 6.

The sum total of the residual lives of parts in the case of part replacement, the sum total of the costs required for maintenance, and other factors can be used as evaluation functions. Of course, since the factors to which importance is to be attached may vary from user to user, it is also possible for the user to provide a plurality of evaluation functions and select any function.

Figure 10:
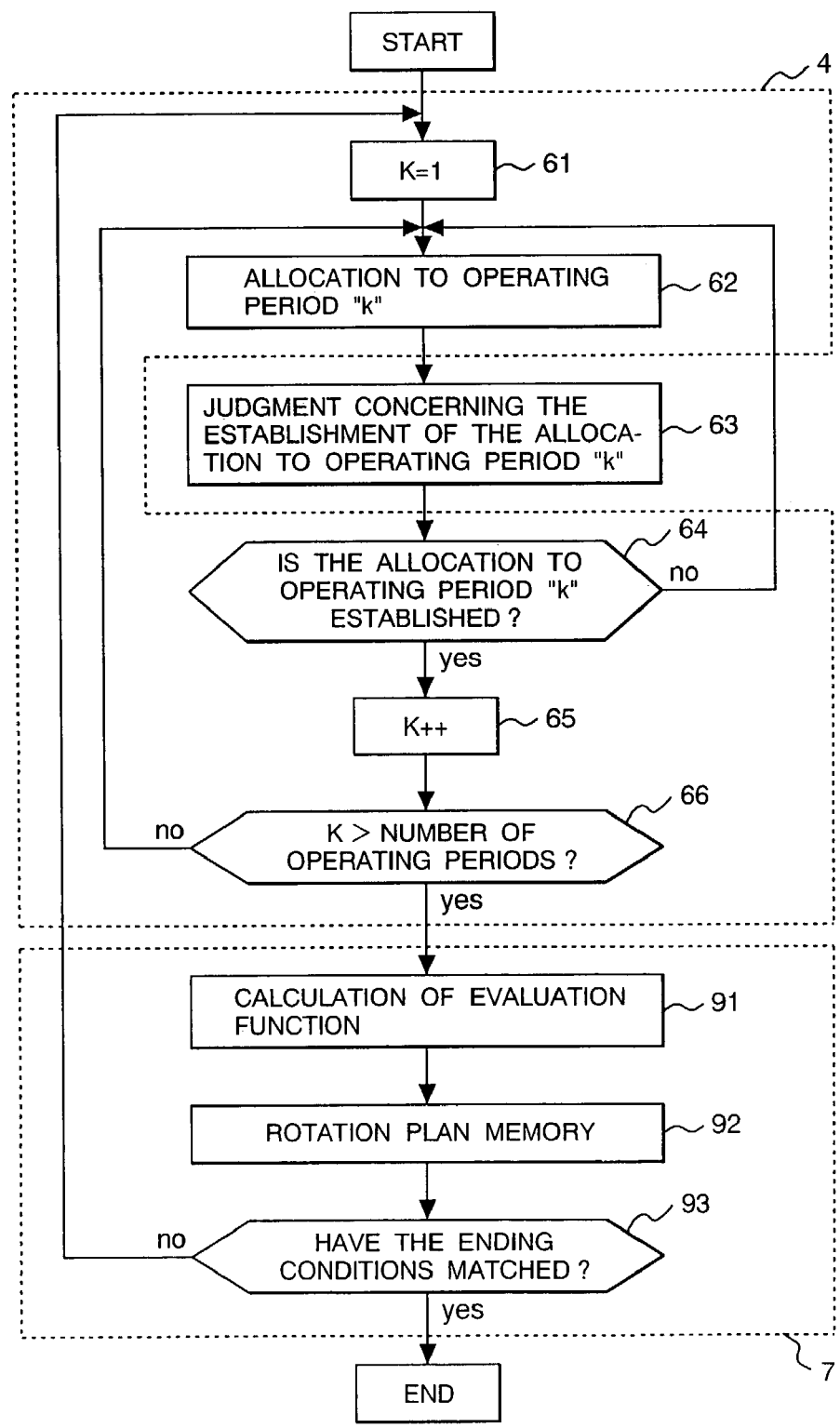
FIG. 10 is a diagram explaining the flow of processing by evaluation function calculating means 7.

FIG. 10 is a block diagram showing the outline of the processes conducted by the evaluation function calculating means 7 of the rotation planning apparatus pertaining to the present embodiment. Description of the processes 61 to 66 shown in FIG. 10 is omitted since these processes are the same as those described in FIG. 6. Of all processes shown in FIG. 10, only processes 61, 62, 64, 65, and 66 boxed with a discontinuous line in the figure are performed by part allocation processing means 4. Although not shown in the figure, process 63 is performed by allocation establishment judging means 5. Processes 91, 92, and 93 are performed by evaluation function calculating means 7.

Process 91 is an evaluation function calculating process using the function of evaluation function calculating means 7, and this evaluation function calculating process is performed on the rotation plan that was set up in processes 61 to 66.

In process 92, the rotation plans that were set up during processes 61 to 63, and the evaluation functions that were calculated in process 91 are stored into the memory.

Process 93 is performed to conduct judgments on the ending conditions of processing. If the ending conditions are satisfied, the sequence will be completed, and if the ending conditions are not satisfied, the sequence will return to process 61 and then processes 61 to 92 will be repeated to set up the next rotation plan. Various methods are available to assign the ending conditions. It would be possible to assign the ending conditions by, for example: setting the desired number of rotation plans beforehand so that when the number of rotation plans that has been stored into the memory exceeds the specified number, processing will be completed; or if the calculation is likely to take too great a deal of time, setting the upper limit for the calculation time; or setting data so that when the value of the evaluation function which has been set by the user during the rotation-planning phase is reached, processing will be completed.

In the case of the embodiment 2 described above using FIG. 10, the contents of the rotation plan set up depend on the operation of part allocation processing means 4 similarly to the case of FIG. 7. In part allocation processing means 4, a total rotation plan can be set up considering the possibility of all parts being allocated to the respective operating periods "k" (k is from 1 to the total number of operating periods), or random allocation is likewise possible. Or allocation can likewise be determined by using an optimizing method such as GA or SA.

As described above, according to the rotation planning apparatus pertaining to the present embodiment, it is possible to establish a plurality of rotation plans and to evaluate and select the respective plans. Similarly to embodiment 1, the rules of allocation, including the evaluation data desired by the user, can be assigned by being entered from a splitting rule input means (not shown in the figure) into the part allocation processing means.

During actual operation planning relating to gas turbines, in particular, since the scheduled inspection and checking periods vary according to the particular plan of the controlling person, not all operating periods are likely to be set to the same length. When each operating period in the rotation-planning period varies in length, a plan for residual part life to be minimized may be establishable according to the way the parts are allocated.

In this way, when establishing a plurality of rotation plans, a better plan can be established by calculating residual life and other evaluation functions. In other words, it is possible, by providing evaluation function calculating means 7 for establishing a plurality of rotation plans, to create the most efficient rotation plan or the rotation plan that the user desires.

FIG. 11 shows an example of details of the display made by the plan display means 6 pertaining to embodiment 2.

Rotation plans of the same period, for example, two rotation plans, 101 and 102, can be set up, and the two plans can be further compared. In FIG. 11, for example, shaft allocation of the parts denoted by numerals 103 and 104 in the first rotation plan 101, and shaft allocation of the parts denoted by numerals 106 and 107 in the second rotation plan 102, are interchanged in terms of position. Along with this, in the first rotation plan 101, the allocation of 103 caused part I to be replaced because of expiry, whereas part 2 can also be allocated to the operating period 6 denoted as 105, and, in the second rotation plan 102, part 1 can also be allocated to the operating period 6 denoted as 108, with the result that the number of parts which requires replacement was reduced from three to two.

Embodiment 3

Next, a third embodiment of the invention pertaining to the present application is described.

Figure 12:
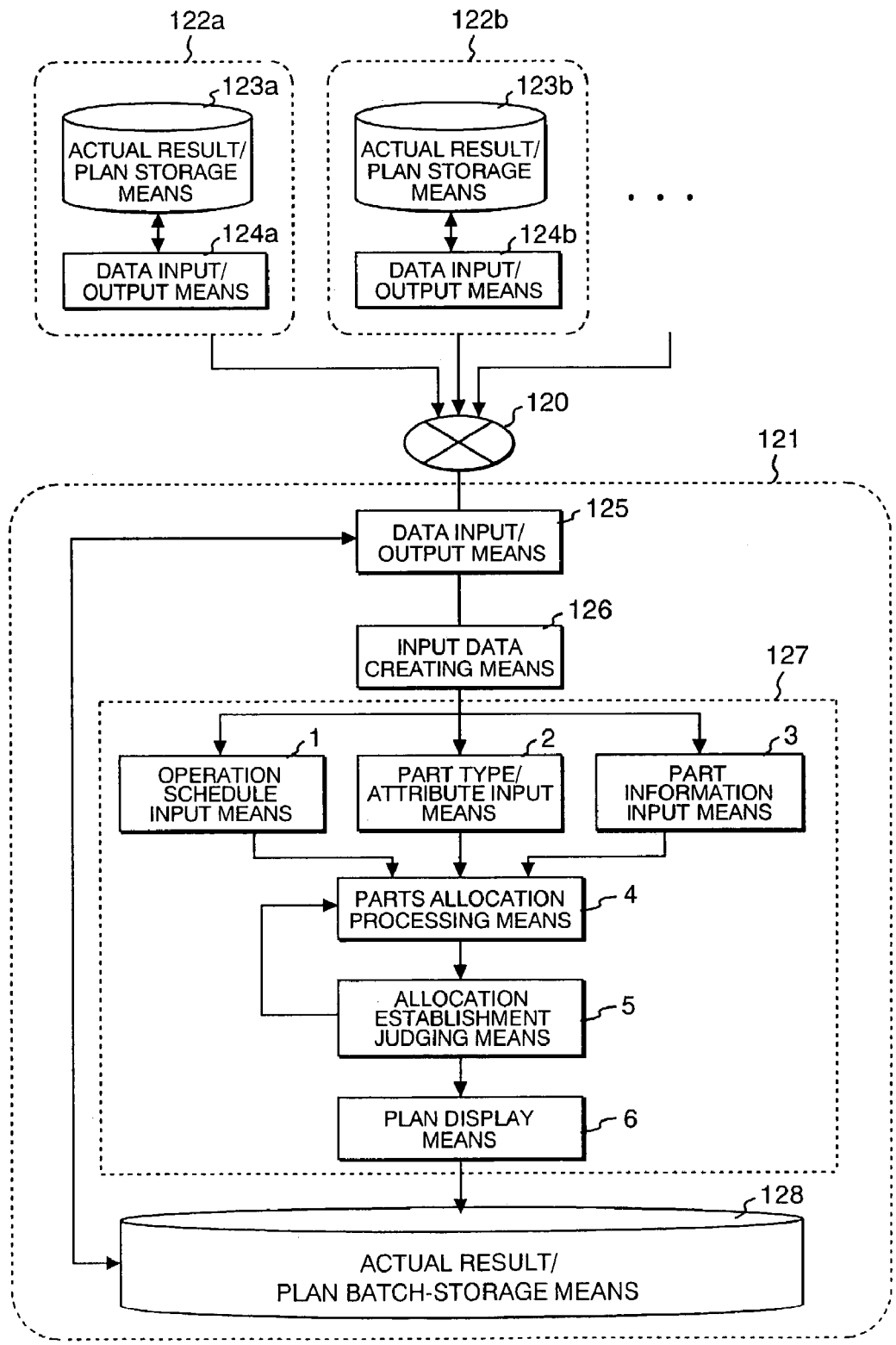
FIG. 12 is a diagram showing the outline of the system employing a rotation planning apparatus.

FIG. 12 is a block diagram showing the outline of a system which uses the rotation planning apparatus pertaining to the present embodiment. Numerals 122a, 122b, etc. in FIG. 12 each denote a plant for operating a single shaft or a plurality of shafts. Numeral 121 denotes a business site at which the actual operation results and operation plan information relating to the plants 122a, 122b, etc. are to be retained and management and maintenance plans are to be established. Plants 122a, 122b, etc. and the business site 121 are connected via a communications means 120 such as a telecommunications line, and data can be exchanged there.

Plants 122a, 122b, etc. are equipped with actual result/plan storage means 123a, 123b, etc., which are means of storing rotation plan information and actual results on each plant. These means are further equipped with data input/output means 124a, 124b, etc., which receive stored information from actual result/plan storage means 123a, 123b, etc. and then transfer the information to business site 121 via communications means 120. Business site 121 has a data input/output means 125, an input data creating means 126, the rotation planning apparatus explained earlier using an embodiment, and an actual result/plan batch-storage means 128. In the figure, all components of the rotation planning apparatus are denoted as numeral 127 for the sake of convenience. Information similar to that stored into actual result/plan storage means 123a, 123b, etc. is stored in batch form into the actual result/plan batch-storage means 128. Also, although the rotation planning apparatus is represented as a first embodiment in the example of FIG. 12, any of the apparatuses pertaining to the embodiments described earlier in this SPECIFICATION can be used instead.

At business site 121, the plan and actual result information that has been transferred via communications means 120 is received by data input/output means 125 and stored into actual result/plan batch-storage means 128. Also, the information to be entered into the rotation planning apparatus is created from received information by input data creating means 126. A rotation plan is set up by rotation planning apparatus 127 using the created information as its input. The established rotation plan is stored into the actual result/plan storage means and sent via communications means 120 to either one or more of the plants 122a, 122b, . . . that correspond to the rotation plan.

Since plants 122a, 122b, etc. and business site 121 are connected via communications means 120, actual and plan rotation data can be shared, even if the plants are distributed apart in various places, whether they be located in one country or in the world.

The rotation of part usage that spans between a plurality of plants can also be planned.

The method of rotation planning in the present embodiment is by: first, transmitting data from plants 122a, 122b, etc. to data input means 124a, 124b, etc. via communications means 120 by use of electronic mail or other media and receiving the corresponding data at the business site; next, after establishing a rotation plan using the received data as its input, storing the established rotation plan into actual result/plan storage means 122, and; finally, transmitting the established rotation plan to the corresponding actual result/plan storage means 123a, 123b, etc. of the plants 122a, 122b, etc. via data input/output means 125 by use of electronic mail or other media.

Or there is an alternative embodiment in which, at a business site 120, a rotation planning apparatus 127 is to be supplied to plants 122a, 122b, etc. via the Internet. In this case, the rotation planning apparatus 127 provided at business site 121 is to be released to the public through an Internet website. At plants 122a, 122b, etc., the corresponding homepage is to be opened using an Internet browser, then the information required for rotation planning is to be received from data input means 124a, 124b, etc., and an execution instruction is to be transmitted. The received information and the execution instruction are then transmitted to business site 121 via communications means 120, and rotation planning apparatus 127 is started. The thus-created rotation plan is stored into actual result/plan batch-storage means 128, and at the same time, this plan is displayed in the Internet browser window at plants 122a, 122b, etc. At plants 122a, 122b, etc., the received rotation plan is stored into the corresponding actual result/plan storage means (such as 123a or 123b) as required.

By, in this way, providing rotation planning apparatuses at a business site and setting up the rotation plans for a plurality of plants, actual results and plan information on the plurality of plants can be managed in batch form at the business site.

The adoption of the present embodiment offers the advantages that the plant owners can set up the appropriate rotation plans without a manual planning load and without a time lag, and that since all rotation planning apparatuses are controlled in batch form at one business site, there is not need to perform maintenance operations on the rotation planning apparatuses themselves.

The adoption of the present embodiment also enable planning for the rotation of part usage between a plurality of plants since actual result/plan information on the plurality of plants is managed in batch form at the business site. In such a case, a business site, namely, a parts manufacturer or a maintenance service provider, can provide batch control of all parts as one form of service, receive established operation plans from plants as input data, set up the rotation plans spanning between a plurality of plants, operate the rotation planning apparatus at the business site, and establish the rotation plans spanning over a plurality of plants.

Although the term "business site" is used in the above embodiment, if the business site is taken to mean either a manufacturer who produces the parts for a plurality of plants and performs the maintenance operations, or a maintenance company, the adoption of the above embodiment makes it possible to understand actual results and plans on each plant beforehand and to establish the appropriate production plans and maintenance plans. In the event that the need arises for the operation plan to be changed at scheduled checking time, since planning is to be accomplished via the system of the business site, when the plan is updated, the new plan will always be transmitted to the business site even if not intended by the user, with the result that the latest plan can always be referred to at the business site without a time delay.

Embodiment 4

Next, a fourth embodiment of the invention pertaining to the present application is described.

Figure 13:
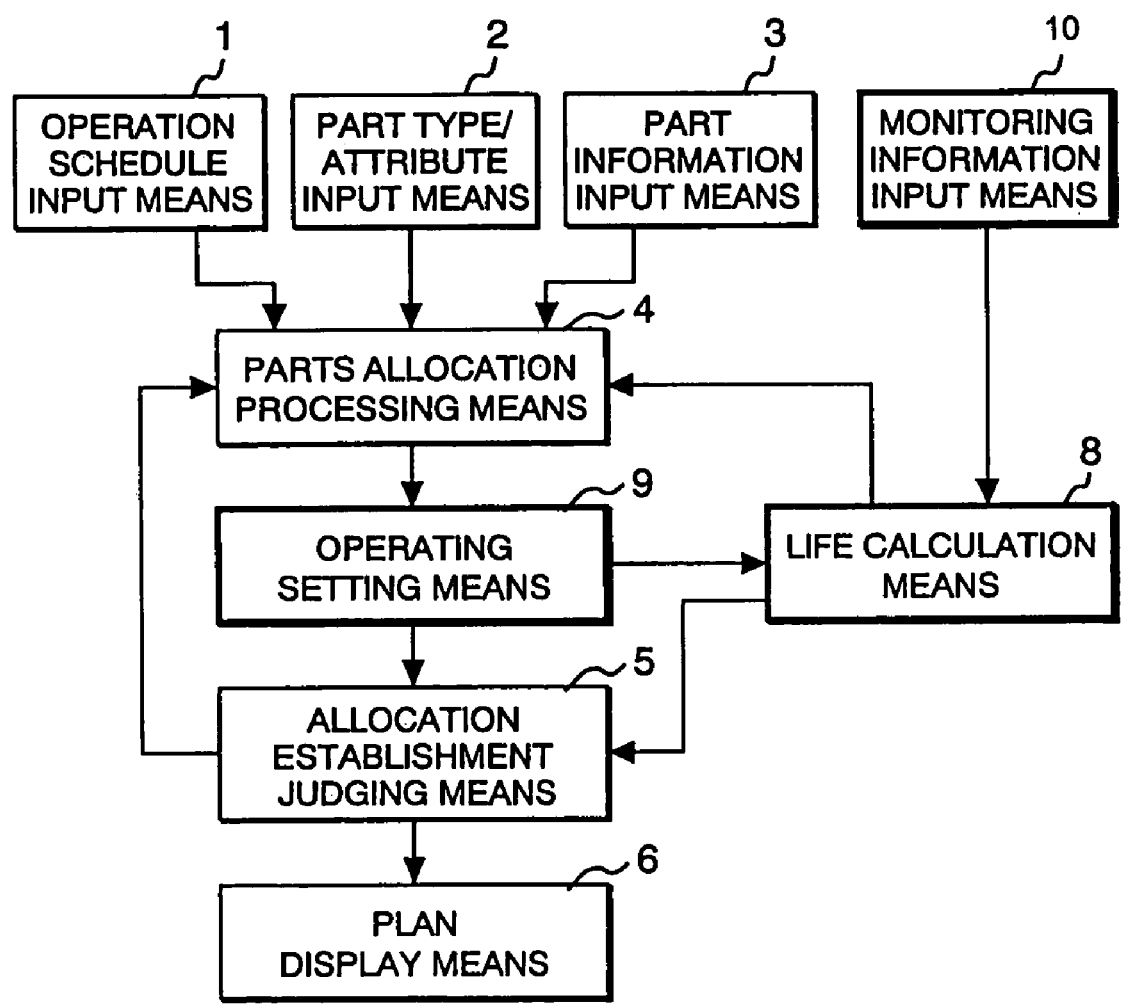
FIG. 13 is a diagram showing the configuration of the rotation planning apparatus pertaining to embodiment 4.

FIG. 13 is a block diagram showing the outline of the processes conducted by the rotation planning apparatus pertaining to the present embodiment. The block diagram of FIG. 13 shows the apparatus configuration in which a monitoring information input means 10, a life calculation means 8, and an operating conditions setting means 9 are added to the apparatus configuration shown in the block diagram of FIG. 1.

The monitoring information input means 10 is a means by which the operation information obtained from the sensors mounted on the plants or shafts whose part usage rotation plans are to be set up is entered into the rotation planning apparatus pertaining to the present embodiment. The life calculation means 8 calculates part damage levels from the entered operating conditions and then calculates the damage levels as the minus life against the designed service life of the parts. The operating conditions setting means 9 sets the operating conditions when rotation plans are established.

In the rotation planning apparatus pertaining to the present embodiment, life calculation means 8 is used to receive the information entered from monitoring information input means 10 and then calculate the current lives of the parts to be used for rotation, and to receive the information sent from operating conditions setting means 9 and then calculate the lives of parts during planning.

The life calculation means 8 used here employs a method of calculating part life by, for example, estimating, from the temperatures of and the stresses, strains, etc. applied to the parts of gas turbines, from the operating temperatures of the gas turbines, and then estimating the damage levels of the parts. That is to say, when measured operating temperatures and other information are entered from monitoring information input means 10, part life is estimated from measured data. It is also possible to adopt an embodiment in which, when the lives of the parts to undergo planning are estimated, the operating conditions are set using operating conditions setting means 9, then the temperature and other data estimated from the set operating conditions are further estimated, and part life is estimated from the information.

Figure 14:
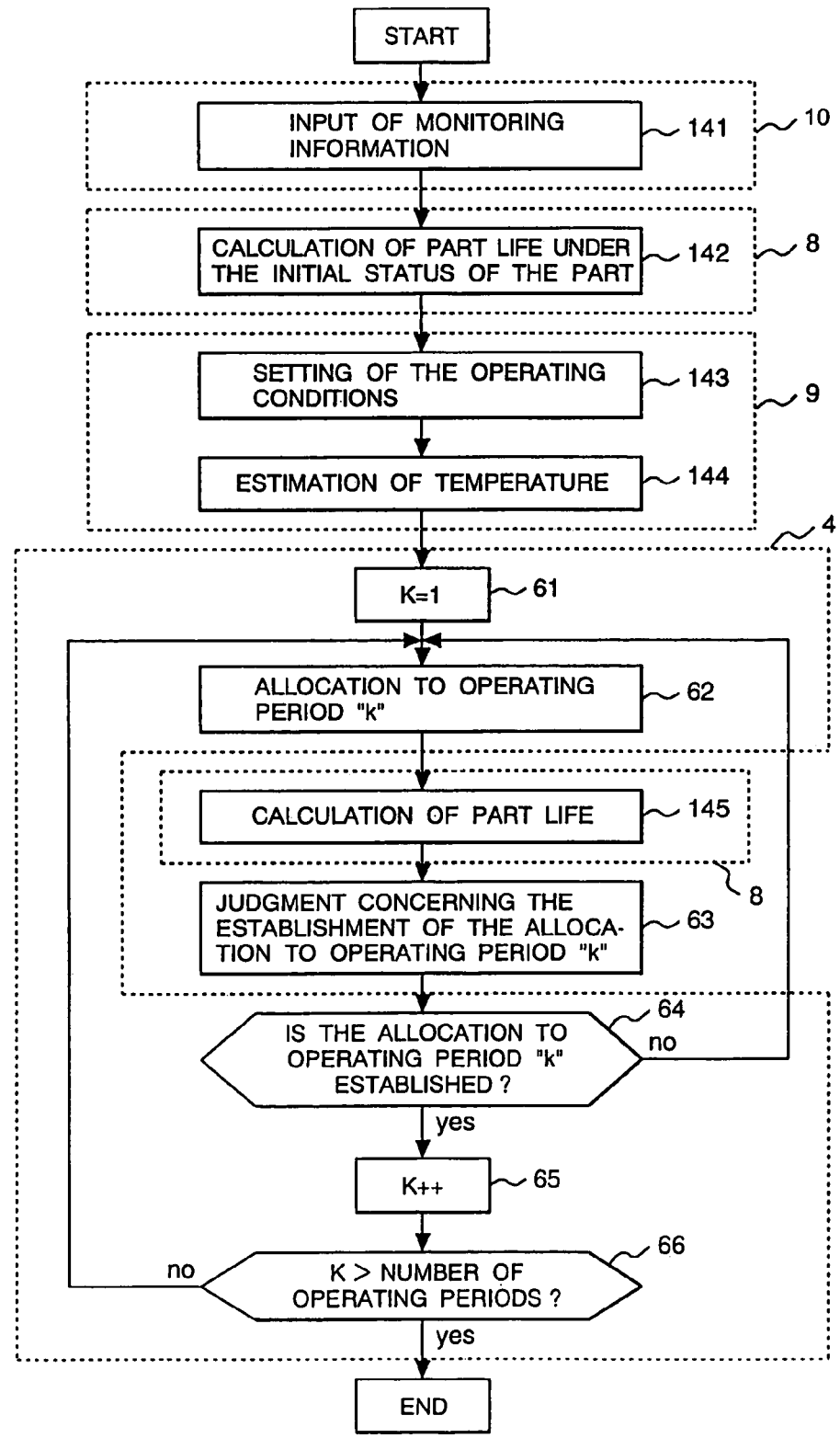
FIG. 14 is a diagram explaining the flow of processing in embodiment 4.

The flow of processing in the fourth embodiment is described using FIG. 14.

Description of the processes 61 to 66 shown in FIG. 14 is omitted since these processes are the same as those described in FIG. 6. Of all processes shown in FIG. 14, only process 141 boxed with a discontinuous line in the figure is performed by the monitoring information input means 7. Processes 142 and 145 are the processes performed by life calculation means 8, and processes 143 and 144 are performed by the operating conditions setting means 9.

Process 141 is performed to receive the monitoring information obtained by observation from sensors during the operation of gas turbines.

In process 142, the part life estimated under an initial status is calculated from the sensor-observation-based monitoring information that was received in process 141.

Process 143 is performed to set the operating conditions estimated during planning. Details of this process are described later.

Process 144 is performed to estimate temperature from the operating conditions that were set during process 143.

In processes 61 and 62, processing described earlier in this SPECIFICATION occurs.

In processes 145, the life of the part which was allocated in process 62 is calculated assuming the operating temperature that was estimated in process 144.

In process 63, judgments on allocation establishment are performed on operating period "k" by use of the part life calculated in process 145.

Subsequently, processes 64 to 66 are conducted similarly to the processes described earlier. If the judgment results are "No", the sequence returns to process 62, and if the results are "Yes", the sequence is completed.

By conducting the above-described processes, the rotation planning apparatus pertaining to the present embodiment can accurately calculate operation life using the temperatures and operating information that have been obtained from the plant or shaft.

Next, operating conditions setting means 9 is described.

Operating conditions setting means 9 sets the operating conditions during planning. This means sets the types of operating patterns to be used when planning plant operation, and after using these patterns to estimate the respective levels of the damage which the part will suffer, uses the results to calculate life.

These operating conditions can be set by, for example, creating a weekly operating schedule (WSS), a daily operating schedule (DSS), and other model patterns beforehand and then selecting each pattern, or defining operating patterns arbitrarily by the user, or selecting a combination of these methods.

When setting up the rotation plan covering a plurality of shafts, it is possible, by adopting the above methods, to create a different operating pattern for each shaft, instead of assuming fixed conditions in any case, or to establish a rotation plan that allows for a different operating pattern according to season.

Embodiment 5

Next, a fifth embodiment of the invention pertaining to the present application is described.

Figure 15:
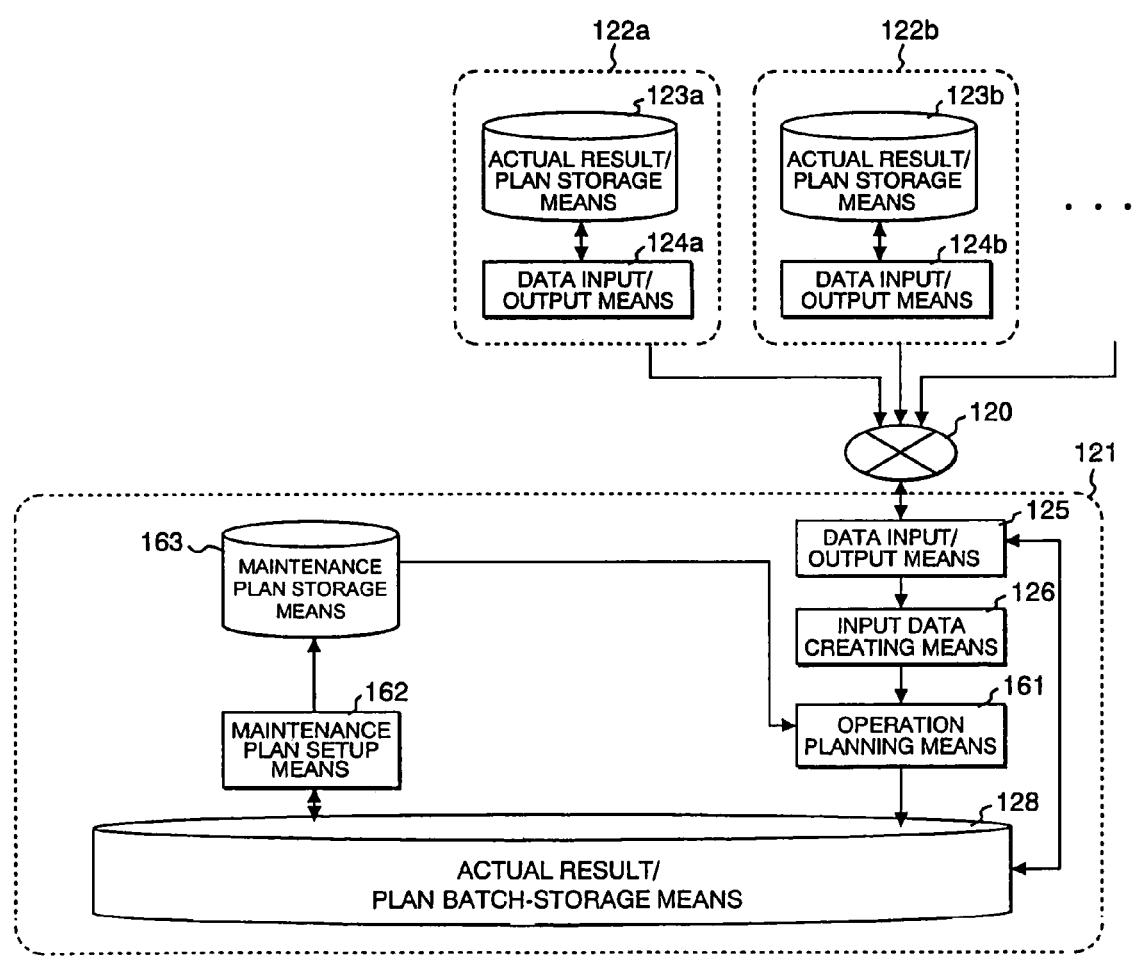
FIG. 15 is a diagram showing the configuration of the operation planning system pertaining to embodiment 5.

FIG. 15 is a block diagram showing the outline of the processes conducted by the rotation planning system pertaining to the present embodiment. The block diagram of FIG. 15 shows the system configuration in which an operation planning means 161, a maintenance plan setup means 162, and a maintenance plan storage means 163 are added to the components 120, 121, 122a, 122b, . . . , 123a, 123b, . . . , 124a, 124b, . . . , 125, 126, and 128 shown in the block diagram of FIG. 12. The components 122a, 122b, etc. are each a plant for operating a single shaft or a plurality of shafts. The component 121 is a business site at which repair, replacement, and other maintenance operations are to be performed on the parts operated by one or more of the plants 122a, 122b, etc.

The operation planning means 161 is for setting up part operation plans. This means outputs planning information on the operating periods of a plurality of shafts and on the repair and disuse-associated replacement timing of the parts at a plurality of plants.

The maintenance plan setup means 162 analyzes the time schedule for the maintenance and delivery required of parts, from the part operation plans that have been established by operation planning means 161, and sets up the maintenance plan covering a plurality of plants 122a, 122b, etc. The maintenance plan storage means 163 stores the maintenance plan that has been established by maintenance plan setup means 162.

Before the operation of parts is planned, the approximate period from the start of use to maintenance (this period is taken as maintenance period "aaa") and the approximate period required for one maintenance operation (this period is taken as maintenance period "bbb") are set as maintenance conditions according to the particular attributes of the part materials. The operation planning means establishes operation plans based on these maintenance periods. Therefore, before the usage time of the parts as a result of their continued use arrives at maintenance period "aaa", the next usage period is to be assigned by providing maintenance period "bbb". Accordingly, the operation planning means makes determinations on maintenance because maintenance must be performed between operating periods for each part. The maintenance plan setup means checks the maintenance plan and the maintenance resources (locations, materials, maintenance personnel, and more) provided at business site 121, against the operation plans established by the operation planning means, and then sets the maintenance periods matching the maintenance resources. If these are not possible, the maintenance plan setup means returns processing to operation planning once again.

Processing by maintenance plan setup means 162 is described below using FIGS. 16 and 17. This description assumes examples of establishing maintenance plans in the case that the maintenance of plants 1 and 2 is conducted at business site 121. FIG. 16 shows examples of an operation plan concerning plant 1, and of a maintenance plan based on the operation plan. FIG. 17 shows an operation plan concerning plant 2, and explains the process of adding a maintenance plan based on the operation plan.

The area boxed with numeral 182 in FIG. 16 shows an example of an operation plan established for plant 1 by operation planning means 161. The vertical and horizontal axes in the figure denote the same as those of FIG. 7. Numerals 183*a*, 184*a*, 185*a*, 185*a*, and 186*a* in operation plan 182 denote the periods of the maintenance required therein.

The area boxed with numeral 187 shows the plan for maintenance at business site 121, created from operation plan 182. For simplicity, two types of resources are assumed as, for example, the resources of the maintenance operations at business site 121, with the maintenance operations being taken as operations 1 and 2. The resources here include the locations where the maintenance operations can be performed, maintenance personnel, and workloads. The schedules for operations 1 and 2 are denoted as lines 188 and 189, respectively. The maintenance periods 183*a*, 184*a*, 185*a*, and 186*a* included in operation plan 182 are allocated to the maintenance periods 183*b*, 184*b*, 185*b*, and 186*b*, respectively, that are included in operation plan 187.

Suppose that when a maintenance plan based on the operation of plant 1 is set up, the maintenance plan to be implemented at business site looks like plan 182. Under this state, numeral 190 in FIG. 17 denotes the operation plan for plant 2, established by operation planning means 161. Numerals 191*a*, 194*a*, and 197*a* denote the maintenance periods required in operation plan 190. Here, the maintenance period 192*a* as against period 191*a* refers to the date of the last day in the usage period preceding the maintenance of part 1, and maintenance period 193*a* refers to the date of the first day in the usage period following the maintenance of part 1. When the maintenance period required of the part is taken as "bbb", therefore, any period "bbb" between periods 192*a* and 193*a* can be defined as maintenance period 191*a*. Likewise, any period "bbb" between periods 195*a* and 196*a* can be set as maintenance period 194*a*, and any period "bbb" between periods 198*a* and 199*a* can be set as maintenance period 197*a*.

Extraction results on the maintenance periods that can be set for each maintenance operations in operating period 190 are shown as numeral 200. This means that any periods "bbb" between periods 192*a* and 193*a*, between periods 195*a* and 196*a*, and between periods 198*a* and 199*a*, can be set as the maintenance periods for part 1 of plant 2, part 3 of plant 2, and part 4 of plant 2, respectively. At this point of time, since, as shown by numeral 187 in FIG. 16, a maintenance plan based on the operation plan for plant 1 is set, it is determined whether the periods "bbb" required for maintenance can be provided between, among all periods denoted as 188 for operation 1 and 189 for operation 2, only those periods not set as a maintenance period which overlap the period from 192*a* to 193*a*, the period from 195*a* to 196*a*, and the period from 198*a* to 199*a* in 200 of FIG. 17.

Numeral 201 denotes a maintenance plan based on the results of assigning unset maintenance periods in 187 of FIG. 16, and on the results of setting the periods as assignable maintenance periods in 200 of FIG. 17. Maintenance periods 191*a*, 194*a*, and 197*a* in operation plan 190 are set to maintenance periods 191*b*, 194*b*, and 197*b*, respectively, which indicates that 191*b*, 194*b*, and 197*b* have been newly added to 187 in FIG. 16. As can be seen from this, of all assignable maintenance periods shown in 200 of FIG. 17, only those which satisfy established restrictions (187 in FIG. 16) on maintenance planning are set as actual maintenance periods, and this is the function of the maintenance plan setup means 162.

Also, the maintenance periods 191*a*, 194*a*, and 197*a* that have been temporarily set in the operation plan of FIG. 17 can be changed to the maintenance periods 191*b*, 194*b*, and 197*b* set as in 201 of FIG. 17.

Although an example in which the maintenance plan is established as in 201 is used in the above description, a plan for which the assignable maintenance periods and the maintenance resources match may not always be establishable for reasons such as overlapping between maintenance periods. In such a case, both the operation plans for each plant and the maintenance plan to be implemented at business site 121 can be set up by returning the sequence to operation planning means 161 and then repeating the above procedure until the maintenance plan matching the maintenance resources has become establishable.

Figure 18:
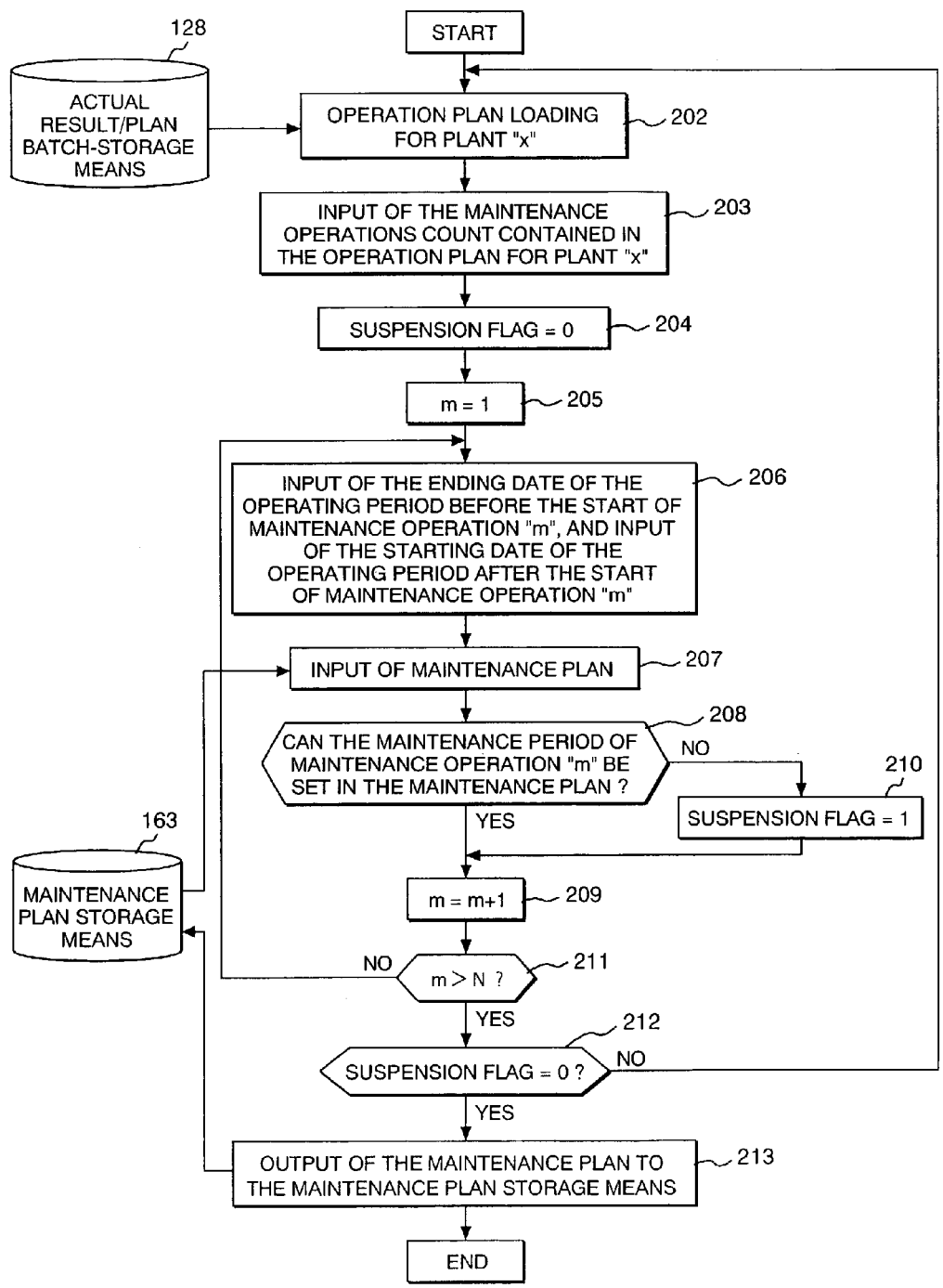
FIG. 18 is a diagram explaining the flow of processing by maintenance plan setup means 162.

The above-described flow of processing by maintenance plan setup means 162 in the present embodiment is summarized in FIG. 18. Processing in this case will be started when operation plans are established by operation planning means 161 and these operation plans are stored into actual result/plan batch-storage means 128.

In process 202, the operation plan for a plant "x" is loaded from actual result/plan batch-storage means 128.

In process 203, the number of maintenance operations, N, included in the operation plan of the plant "x" is entered. In the example of plant 2 that has been shown earlier, the value of N is 3 for parts 1, 3, and 4 each.

In process 204, the suspension flag is set to 0.

In process 205, maintenance counter "m" is initialized to 1.

In process 206, the ending date of the usage period preceding the maintenance operation "m", and the starting date of the usage period following the maintenance operation "m" are entered. In the example of FIG. 17, the ending date of the usage period preceding the maintenance of, for example, part 1 at site 2 corresponds to the date of 192*a*, and the starting date of the usage period following the maintenance of part 1 at site 2 corresponds to the date of 193*a*.

In process 207, the maintenance plan of business site 121 that is already determined at the particular point of time is entered. In the foregoing example, maintenance plan 187 in FIG. 16 is entered.

In process 208, it is judged whether the maintenance period of the maintenance operation "m" can be set so as to match the maintenance resources. More specifically, this process is intended for cross-checking, in 200 of FIG. 17 in the foregoing example, between assignable maintenance periods and the periods for which the maintenance operations in maintenance resources 188 or 189 in 187 of FIG. 16 are not set, and then judging whether the maintenance periods "bbb" required can be provided in any overlapping periods. If the results are "Yes", the sequence proceeds to process 209, and if the results are "No", the sequence skips to process 210.

In process 209, if the judgment results in process 208 are "Yes", "m=m+1" is assigned and the maintenance to be judged is advanced by one step.

In process 210, if the judgment results in process 208 are "No", the suspension flag is set to 1 since maintenance period setting for maintenance operation "m" is regarded as suspended. After that, the sequence returns to process 209.

Process 211 is performed to judge whether "m>N". If the results are "Yes", the sequence proceeds to process 212 since the maintenance periods of all maintenance operations are regarded as having been settable. If the results are "No", the sequence returns to process 206 since there are maintenance operations regarded as having not yet been confirmed as to whether the respective maintenance periods can be set.

Process 212 is performed to check whether maintenance operations whose maintenance period setting is suspended are present after it has been confirmed that the maintenance period can be set for all maintenance operations. If the suspension flag is set to 0, since this indicates that the maintenance period can be set for all maintenance operations, the sequence proceeds to process 213. If the suspension flag is set to 1, since this indicates that there are maintenance operations for which it was unable to set the maintenance period, the sequence returns to process 202, from which operation planning for plant "x" is then repeated. In process 213, the maintenance plan that has been set through the above processes is output to the maintenance plan storage means.

Although this is not shown in the figure, the maintenance periods existing during operation planning can also be updated on the basis of the maintenance plan that was set up in process 213.

The above example assumes that when maintenance operations are performed at business site 121, there are restrictions on maintenance resources. Even if restrictions are not present, however, the maintenance plan setup means can also be used to calculate the quantitative requirements of resources by arranging a plurality of plant maintenance periods in such a format as shown as 201 in FIG. 17.

Embodiment 6

Next, a sixth embodiment of the invention pertaining to the present application is described.

Figure 19:
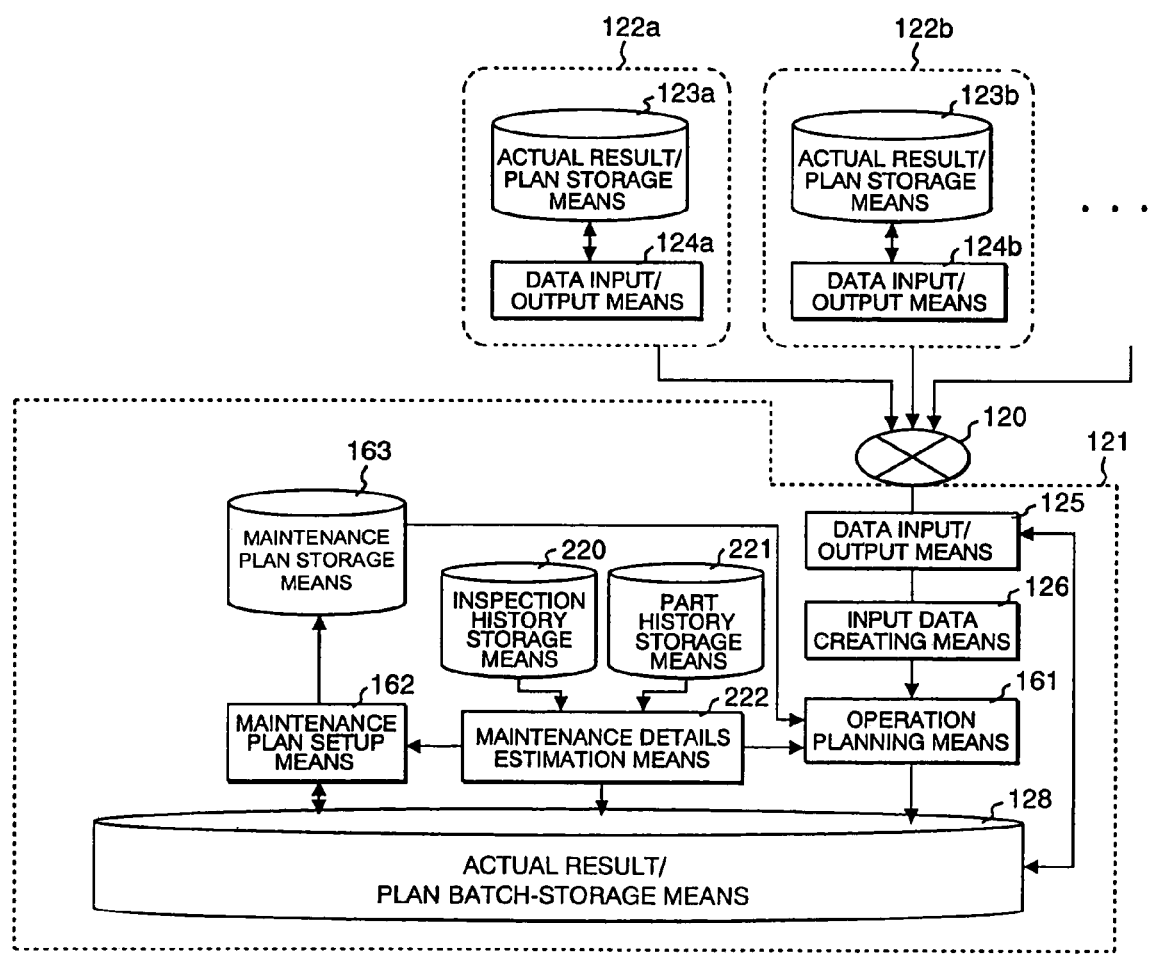
FIG. 19 is a diagram showing the configuration of the operation planning system pertaining to embodiment 6.

FIG. 19 is a block diagram showing the outline of the processes conducted by the rotation planning system pertaining to the present embodiment. The block diagram of FIG. 19 shows the system configuration in which an inspection history storage means 220, a part history storage means 221, and a maintenance details estimation means 222 are added to the configuration shown in the block diagram of FIG. 15.

The inspection history storage means 220 stores the historical information indicating what types of parts suffered what types of damage during checking such as periodic inspection. In the case of a single-stage rotor blade, for example, the historical information refers to information on the sectional decrease levels of thickness measured for each independent part during periodic checking. The information can be used as the basis for searching for the corresponding record arbitrarily with the identification number, damage level, and other record details of the particular part, as the key.

The part history storage means 221 stores historical information on independent parts. Examples of the types of information stored include (1) what shaft was used for how many hours during what period, (2) what types of maintenance were conducted in what quantities at what number of hours of use, and so on. These types of information can be used as the basis for searching for the corresponding record arbitrarily with the identification number, usage time, and others of the particular part, as the key.

The maintenance details estimation means 222 is a means by which, in connection with the maintenance of parts according to the operation plans which were established by operation planning means 161, the historical information of parts that is obtained from the foregoing inspection history storage means 220 and part history storage means 221, is to undergo statistical processing to extract tendencies and thus to estimate maintenance details based on the tendencies.

Figure 20:
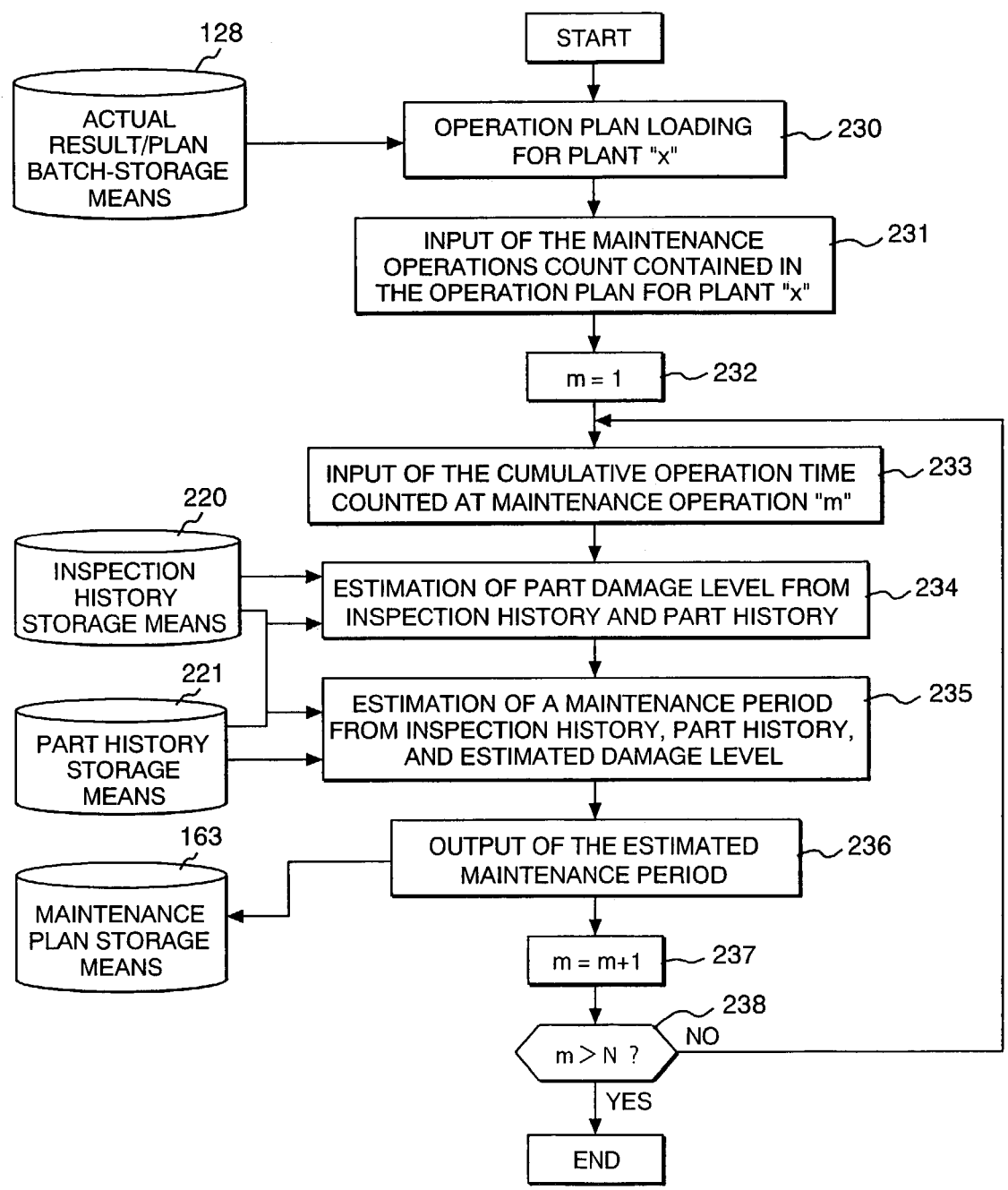
FIG. 20 is a diagram explaining the flow of processing by maintenance details estimation means 222.

The more specific flow of the processes performed by maintenance details estimation means 222 is shown in FIG. 20. These processes will be started when operation plans are established by operation planning means 161 and these operation plans are stored into actual result/plan batch-storage means 128.

In process 230, the operation plan for a plant "x" (either from 122a, 122b, etc. in FIG. 19) is loaded from actual result/plan batch-storage means 128.

In process 231, the number of maintenance operations, N, included in the operation plan of the plant "x" is entered. In process 232, the counter "m" of the maintenance operations covered for the plant "x" is initialized to 1.

In process 233, the usage time of parts at the start of maintenance "m" is entered. For 190 of FIG. 17, the usage time of part 1 at the start of maintenance 191a, for example, corresponds to the usage time of part 1 at date 192a. This usage time value is taken as "ccc" for the convenience of explanation.

Process 234 is performed to estimate part damage levels from the inspection history and the part history. In this process, the part historical record corresponding to the usage time closest to the usage time "ccc" which was entered in process 233 is extracted from inspection history storage means 220 and part history storage means 221, and actual data on the damage level of a specific independent part before and after usage time "ccc" is reached is further extracted. The damage level of the particular part at usage time "ccc" is estimated from statistical quantities such as the average value of the above sets of data. This usage time value is taken as "ddd" for the convenience of explanation.

Process 235 is performed to estimate the types and details of maintenance required, from the inspection history and the part history. In this process, in the case of the part damage level "ddd" that was estimated in process 234, what types of maintenance were performed, namely, the types and details of maintenance which was provided, are estimated by extracting, from inspection history storage means 220 and part history storage means 221, the record closest to part damage level "ddd". More specifically, the period that was spent in maintenance, the types and details of maintenance, and other factors are estimated.

In process 236, the maintenance period that was estimated in process 235 is output to maintenance plan storage means 163.

In process 237, maintenance counter "m" is incremented by 1 (namely, "m=m+1") and the maintenance to undergo processing is advanced by one step.

In process 238, it is judged whether "m>N". If the judgment results are "Yes", the sequence is completed since the maintenance periods of all maintenance operations are regarded as having been estimated. If the results are "No", the sequence returns to process 233 since maintenance operations whose maintenance periods are not yet estimated are regarded as present.

By conducting these processes, it is possible to estimate the periods required for each maintenance operation covered in the operation plan set up by operation planning means 161, and to set up a maintenance plan based on estimation results. Although, in the description of the above example, the maintenance details estimated have been limited to the maintenance period required, the number of persons actually engaged in the maintenance, the quantities of materials actually consumed, and other resources can also be estimated by recording, in addition to the factors described earlier in the above example, these resources as the detailed maintenance information to be added to the part history stored into part history storage means 221.

In these processes, only the usage time during the intended maintenance has been described as the data to be entered. It is possible, however, to enter not only such usage time data, but also conditions such as the operating temperatures and types of shafts which were used, and to estimate maintenance details by searching for the corresponding record. In such a case, however, new input items must have already been registered as the items of the part history.

Also, although, in the flow of these processes, the entered usage time of parts becomes the basis for the search from inspection history storage means 220 and part history storage means 221, usage time can likewise be estimated by creating master curves of usage time and damage levels for each part and then making reference to the master curves, based on the entered usage time of parts during the corresponding maintenance operations. In this case, instead of creating one type of master curve for each part, a plurality of curves can be provided in classified form according to operating conditions such as the operating temperatures and types of shafts to be used.

In addition, although, in the flow of these processes, a method of estimating the damage levels of parts from their usage time and then estimating the quantity of maintenance, from the damage levels, has been exemplified, the quantity of maintenance can likewise be estimated from actual past maintenance result data classified according to the particular usage time of parts, by using the usage time as input data.

Embodiment 7

Next, a seventh embodiment of the invention pertaining to the present application is described.

Figure 21:
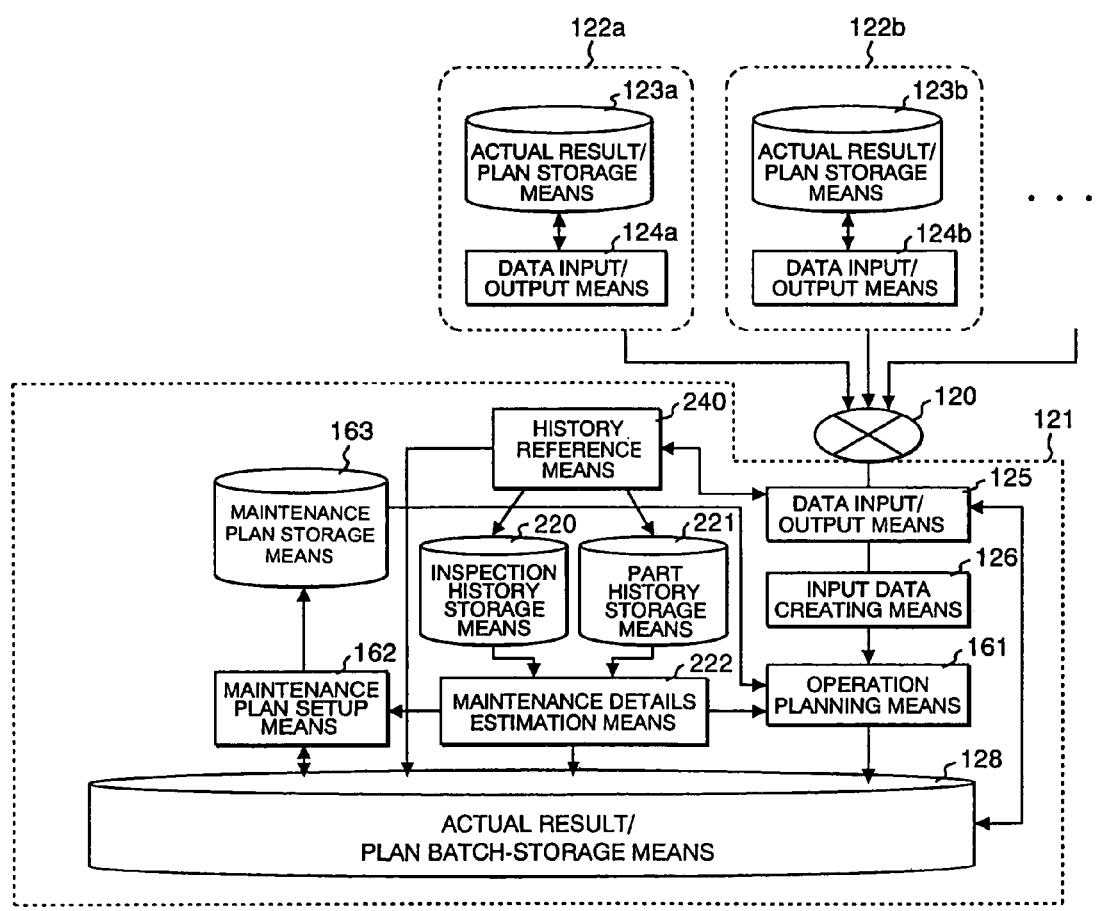
FIG. 21 is a diagram showing the configuration of the operation planning system pertaining to embodiment 7.

FIG. 21 is a block diagram showing the configuration in which a history reference means 240 is added to the configuration shown in the block diagram of FIG. 19. The history reference means 240 is a means by which the histories of parts and the history of inspection are referred to from either the operation plans established by operation planning means 161, or actual operation result data.

FIG. 22 shows a display example explaining the embodiment of the history reference means 240.

In window 241, the operation plans set up by operation planning means 161, or actual operation result data is displayed. The actual operation result data or operation plans that were stored within actual result/plan storage means 123a, 123b, etc. or actual result/plan batch-storage means 128 are displayed in chart form in this window. When any operating period 243 is selected in this window by use of a mouse 242, information that was stored within part history storage means 221 will be displayed for the part 2 corresponding to the selected operating period. For example, if a plurality of independent parts, such as single-stage rotor blades, are to be operated as a set, the histories of each independent part included in the set called the "selected part 2" will be displayed as shown in window 244. Details of the historical information displayed include what types of shafts were used, when they were used, and how many hours they were used, or what types of maintenance were provided over what periods, and so on. Since such historical information is not stored in actual result/plan storage means 123a, 123b, etc. or actual result/plan batch-storage means 128, history reference means 240 has the function that first acquires the part number (in the case of a set, the set number) corresponding to the operating period which was selected using mouse 242, then after retrieving the acquired part number from part history storage means 221 and extracting information on the independent part to be used in the operating period, and displays the information.

For the parts handled as a set, in particular, if the set contains too many independent parts, not all these parts have the same history. History reference means 240 is therefore valid for confirming the historical information of individual independent parts and establishing operation plans.

This means can also be used to refer to and display not only part histories, but also inspection histories.

Embodiment 8

Next, an eighth embodiment of the invention pertaining to the present application is described.

Figure 23:
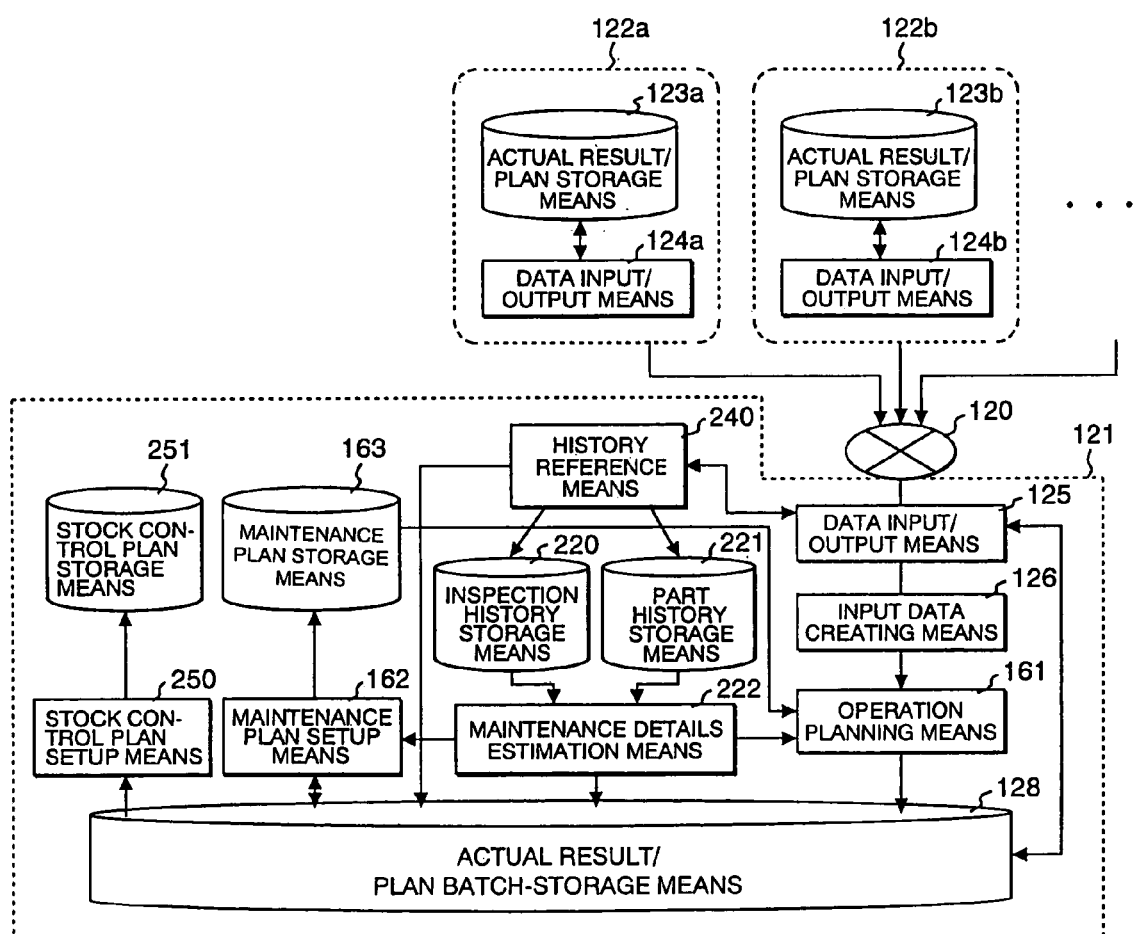
FIG. 23 is a diagram showing the configuration of the operation planning system pertaining to embodiment 8.

FIG. 23 shows the configuration in which a stock control plan setup means 250 and a stock control plan storage means 251 are added to the configuration shown in the block diagram of FIG. 21. The stock control plan setup means 250 refers to the operation plans for the plants 122a, 122b, etc. to which the parts required are supplied from business site 121, analyzes data on the plurality of plants to confirm the time when new parts are introduced by expiry-associated disuse of existing parts, and determines the purchase timing of the new parts and the necessary stock control plans based on the purchase timing. When operation planning means 161 is executed at business site 121 and the contents of actual result/plan batch-storage means are updated, the stock control plan setup means will be started and then it will update the stock control plans by referring to the updated operation plans. The stock control plan storage means 251 is a means into which are stored the stock control plans that have been set up by stock control plan setup means 250. The items controlled by stock control plan storage means 251 include, but are not always limited to, information such as the delivery timing, ordering timing, stock volumes, and planned delivery destinations of each part.

Since it is possible to analyze a plurality of plant operation plans over long terms and to immediately accommodate any plan changes, parts can also be purchased over long terms according to plan, not as required. For example, in the case that the purchase of parts in great quantities at a time reduces the purchase costs, the present embodiment provides significant advantages.

Embodiment 9

Next, a ninth embodiment of the invention pertaining to the present application is described.

Figure 24:
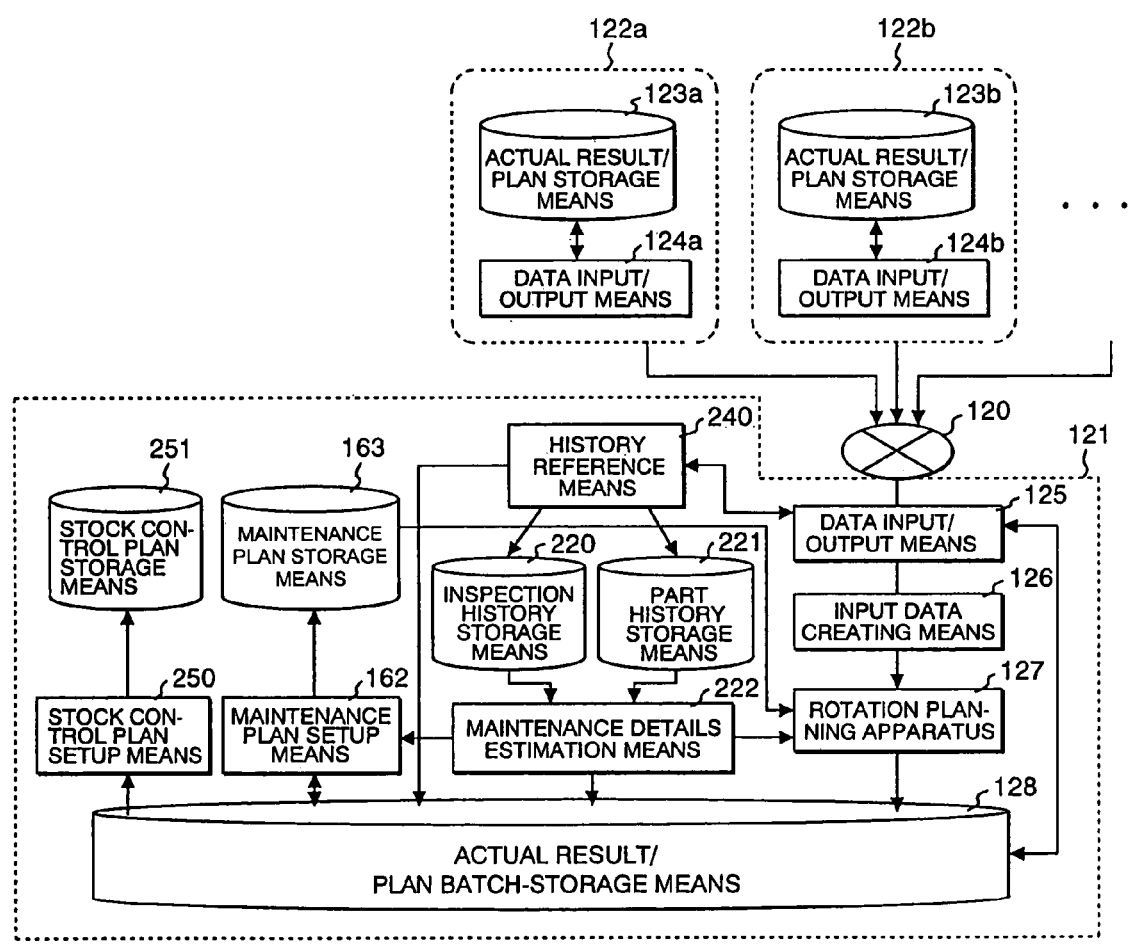
FIG. 24 is a diagram showing the configuration of the operation planning system pertaining to embodiment 9.

FIG. 24 shows the configuration in which the rotation planning apparatus shown as 127 in FIG. 12 has been adopted as the operation planning means 161 shown in the block diagram of FIG. 12. Maintenance plans and stock control plans based on the optimal rotation plans can be set up as part operation plans by employing as the operation planning means 161 described in embodiment 6, 7, or 8, the foregoing rotation planning apparatus described in either embodiment 1, embodiment 2, embodiment 3, embodiment 4, or embodiment 5. Hereby, the operation of parts that is efficient to plants 122a, 122b, etc. and desirable to the owners of the plants can be achieved and highly efficient maintenance based on such operation can be provided, without a time delay, at the business site undertaking the maintenance of the plants 122a, 122b, etc.

As set forth above, the use of the present invention makes it possible to reduce manual rotation-planning loads significantly and to establish a plurality of rotation plans, and the calculation of residual life and other evaluation data makes it possible to perform comparative evaluations between the plurality of rotation plans and thus to establish more efficient rotation plans.

In addition, as described using FIG. 8 of embodiment 1, the optimal evaluation-based rotation plan that the user desires can always be created, updated, and displayed according to the particular operations of the pointing device.

The application of the present invention to the combustor parts, rotor blades, stationary blades, shrouds, discs, and other high-temperature parts that require replacement and, occasionally, repair, enables setup of the plans for part usage rotation between a plurality of shafts.

(Effects of the Invention)

According to the present invention, highly efficient rotation plans for use between a plurality of shafts or plants and with a minimum stock of spares can be established.

Actual result data and plan data can also be shared between plants and a manufacturer or maintenance company who undertakes the production and maintenance of parts, without being aware of data update management. Thereby, the manufacturer can acquire information on the actual operation result data and plans of each plant, without a time delay, and conduct more economical production activities based on planned production and manufacture, and is thus most likely to supply less expensive parts to the user. Also, initial capital investments on computers, systems, and the like, can be minimized at individual plants.

What is claimed is:

1. A rotation planning apparatus comprising:
   an operation schedule input means for accepting schedule information relating to equipment operation and shutdown for inspection of a plurality of shafts, and transmitting corresponding information,
   a part type/attribute input means for accepting attribute information relating to lives, maintenance periods required, and other attributes of a plurality of parts, and transmitting corresponding information,
   a part information input means for accepting part information relating to the plurality of parts as well as to replacement parts to be used in rotation with at least some of the plurality of parts, and transmitting corresponding information,
   a part allocation processing means for receiving the corresponding information transmitted by said operation schedule input means, said part type/attribute input means, and said part information input means, allocating appropriate parts based on the corresponding information received, and outputting part allocation information,
   an allocation establishment judging means for receiving said part allocation information, judging whether the appropriate parts can be put into operation during allocated operating periods, and outputting allocation establishment information, including an allocation of the plurality of parts and the replacement parts to the shafts, and
   a display means for receiving the allocation establishment information and displaying the allocation establishment information, a total operation time of each of the plurality of parts, and a maintenance schedule for each of the plurality of parts for implementing a rotation plan.

2. The rotation planning apparatus as set forth in claim 1, further comprising an evaluation function calculating means for performing data calculations on established rotation plans, calculating evaluation values for said established rotation plans, and outputting the evaluation values to the plan display means.

3. The rotation planning apparatus as set forth in claim 1, further comprising monitoring information input means for receiving operation information from sensors on said shafts and outputting monitored information.

4. The rotation planning apparatus as set forth in claim 3, further comprising operation condition setting means for setting operating conditions and outputting operating condition set information.

5. The rotation planning apparatus as set forth in claim 4, further comprising life calculation means for receiving the monitored information and the operating condition set information, calculating part damage levels, calculating reductions in part service lives, determining part service life reduction information, and outputting the part service life reduction information to the part allocation processing means and the allocation establishment judging means.

6. A rotation planning system comprising a plurality of rotation planning apparatuses connected through a telecommunications line, at least one of said rotation planning apparatuses comprising:
   an operation schedule input means for accepting schedule information relating to equipment operation and shutdown for inspection of a plurality of shafts, and transmitting corresponding information,
   a part type/attribute input means for accepting attribute information relating to lives, maintenance periods required, and other attributes of a plurality of parts, and transmitting corresponding information,
   a part information input means for accepting part information relating to the plurality of parts as well as to replacement parts to be used in rotation with at least some of the plurality of parts, and transmitting corresponding information,
   a part allocation processing means for receiving the corresponding information transmitted by said operation schedule input means, said part type/attribute input means, and said part information input means, allocating appropriate parts based on the corresponding information received, and outputting part allocation information,
   an allocation establishment judging means for receiving said part allocation information, judging whether the appropriate parts can be put into operation during allocated operating periods, and outputting allocation establishment information, including an allocation of the plurality of parts and the replacement parts to the shafts, and
   a display means for receiving the allocation establishment information and displaying the allocation establishment information, a total operation time of each of the plurality of parts, and a maintenance schedule for each of the plurality of parts for implementing a rotation plan.

7. The rotation planning system as set forth in claim 6, wherein the at least one of said rotation planning apparatuses further comprises an evaluation function calculating means for performing data calculations on established rotation plans, calculating evaluation values for said established rotation plans, and outputting the evaluation values to the plan display means.

8. The rotation planning system as set forth in claim 6, wherein the at least one of said rotation planning apparatuses further comprises monitoring information input means for receiving operation information from sensors on said shafts and outputting monitored information.

9. The rotation planning system as set forth in claim 8, wherein the at least one of said rotation planning apparatuses further comprises operation condition setting means for setting operating conditions and outputting operating condition set information.

10. The rotation planning system as set forth in claim 9, wherein the at least one of said rotation planning apparatuses further comprises life calculation means for receiving the monitored information and the operating condition set information, calculating part damage levels, calculating reductions in part service lives, determining part service life reduction information, and outputting the part service life reduction information to the part allocation processing means and the allocation establishment judging means.

* * * * *